United States Patent
Drucker et al.

(10) Patent No.: US 6,249,710 B1
(45) Date of Patent: Jun. 19, 2001

(54) METHOD AND APPARATUS FOR MANAGING THE THERMAL ACTIVITY OF A MICROWAVE OVEN

(75) Inventors: Steven J. Drucker, Atlanta; David Marcel Raynault, Roswell, both of GA (US)

(73) Assignee: Microwave Science, LLC, Norcross, GA (US)

( * ) Notice: Subject to any disclaimer, the term of this patent is extended or adjusted under 35 U.S.C. 154(b) by 0 days.

(21) Appl. No.: 09/100,629

(22) Filed: Jun. 19, 1998

Related U.S. Application Data

(63) Continuation-in-part of application No. 08/647,568, filed on May 14, 1996, now Pat. No. 5,812,393, and a continuation-in-part of application No. 08/840,526, filed on Apr. 21, 1997, now Pat. No. 5,883,801.

(51) Int. Cl.[7] .................................................. G05B 11/01
(52) U.S. Cl. .............................. 700/15; 700/13; 700/17; 700/18; 700/210; 700/211; 702/130; 702/528; 219/702; 219/703; 219/710; 219/719; 219/720
(58) Field of Search ................................ 700/13, 14, 15, 700/18, 17, 208, 210, 211; 702/130, 528.34; 704/9, 246, 251, 275, 1, 3; 219/702, 703, 710, 719, 720

(56) References Cited

U.S. PATENT DOCUMENTS

| | | | |
|---|---|---|---|
| 4,317,976 | * | 3/1982 | Noda .................................. 219/10.55 |
| 4,317,977 | | 3/1982 | Buck .............................. 219/10.55 B |
| 4,351,999 | * | 9/1982 | Nagamoto et al. ................ 219/10.55 |
| 4,375,586 | * | 3/1983 | Ueda .................................. 219/10.55 |
| 4,447,693 | | 5/1984 | Buck ............................ 219/10.55 M |
| 4,780,588 | * | 10/1988 | Edamura ................................ 219/492 |
| 4,794,219 | | 12/1988 | Eke ................................ 219/10.55 M |
| 4,970,359 | | 11/1990 | Oh ................................ 219/10.55 M |
| 5,283,410 | | 2/1994 | Kim ..................................... 219/704 |
| 5,317,133 | | 5/1994 | Sundstrom et al. .................. 219/716 |
| 5,367,145 | | 11/1994 | Takagi .................................. 219/494 |
| 5,550,355 | | 8/1996 | Jung ..................................... 219/709 |
| 5,616,269 | | 4/1997 | Fowler et al. ........................ 219/720 |
| 5,624,697 | | 4/1997 | Lin et al. .............................. 426/241 |
| 5,884,249 | * | 3/1999 | Namba et al. ........................... 701/9 |
| 5,893,051 | * | 4/1999 | Tomohiro .............................. 702/130 |

FOREIGN PATENT DOCUMENTS 0 503 898 A1   9/1992   (EP) ................................ H05B/6/68

\* cited by examiner

Primary Examiner—Paul P. Gordon
Assistant Examiner—Ramesh Patel
(74) Attorney, Agent, or Firm—Bernstein & Assoc., P.C.; Jason A. Bernstein

(57) ABSTRACT

The present invention provides an interpretive BIOS machine for controlling the cooking of food in a microwave oven or the conduct of a physical, chemical, or thermodynamic process stream wherein the microwave oven or process stream functionally operates by user independent commands. The interpretive BIOS machine is implemented by a microprocessor or computer having a memory for the storing of a program that contains the operating instruction for the present invention. Data is received into the interpretive BIOS machine from a data entry mechanism. The data is specific code that represents a plurality of desired cooking or process instructions selected by the user of the microwave oven or process stream. The present invention interprets the received data and transforms the data into time duration(s) and scaled power level(s) settings for the microwave oven or process stream. The present invention monitors and adjusts the work performed on a specimen disposed within the microwave oven or process stream.

9 Claims, 17 Drawing Sheets

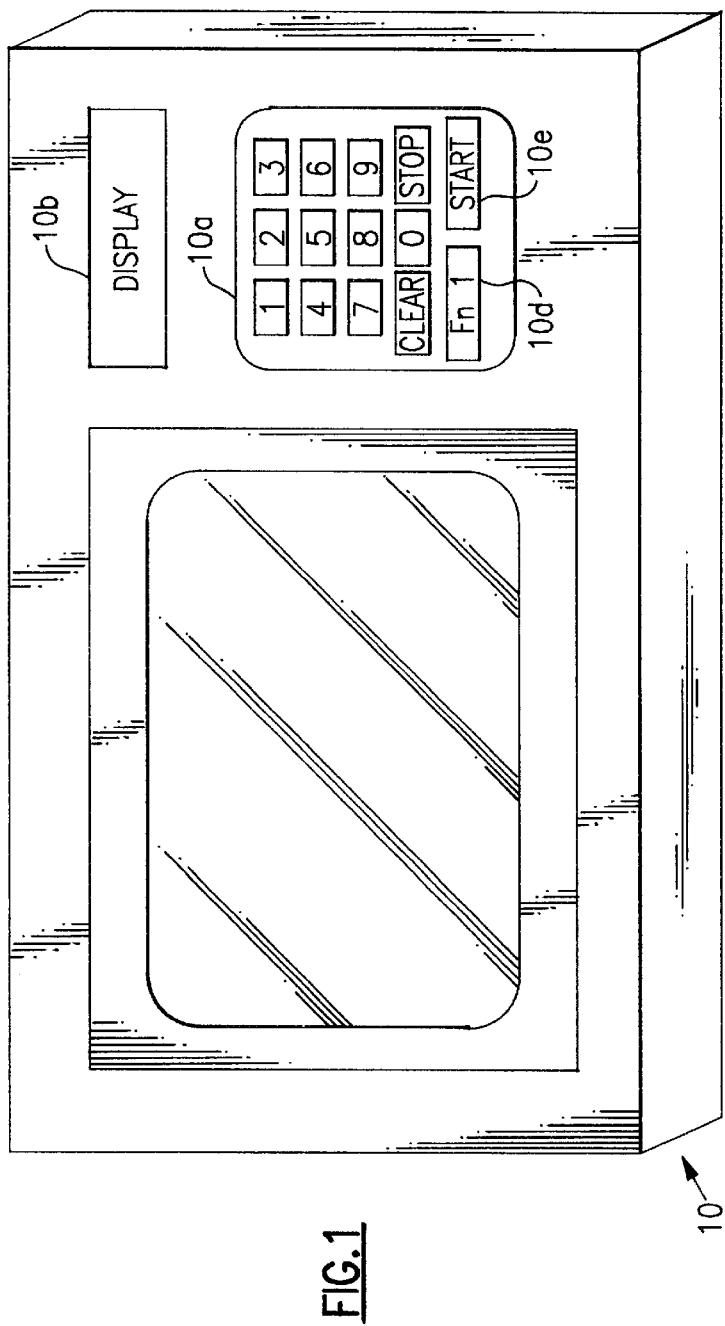
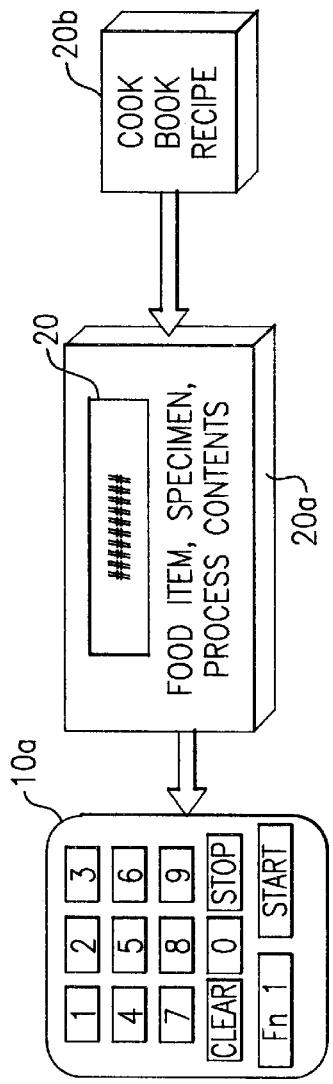
FIG.1
FIG.2

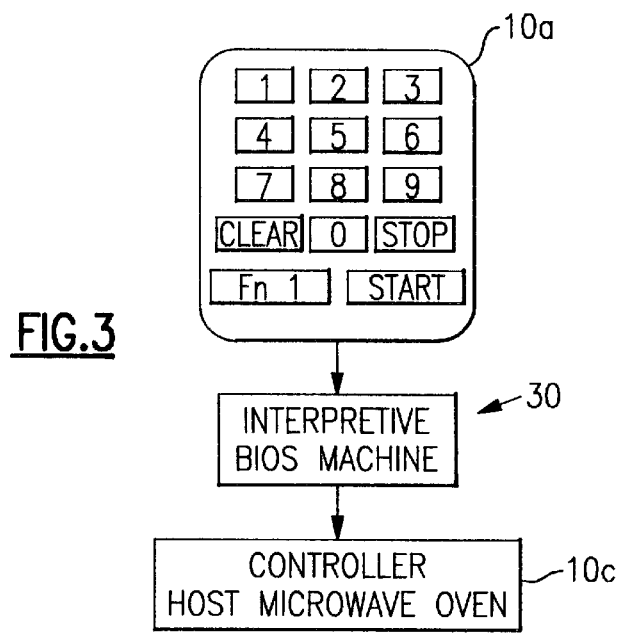
FIG.3
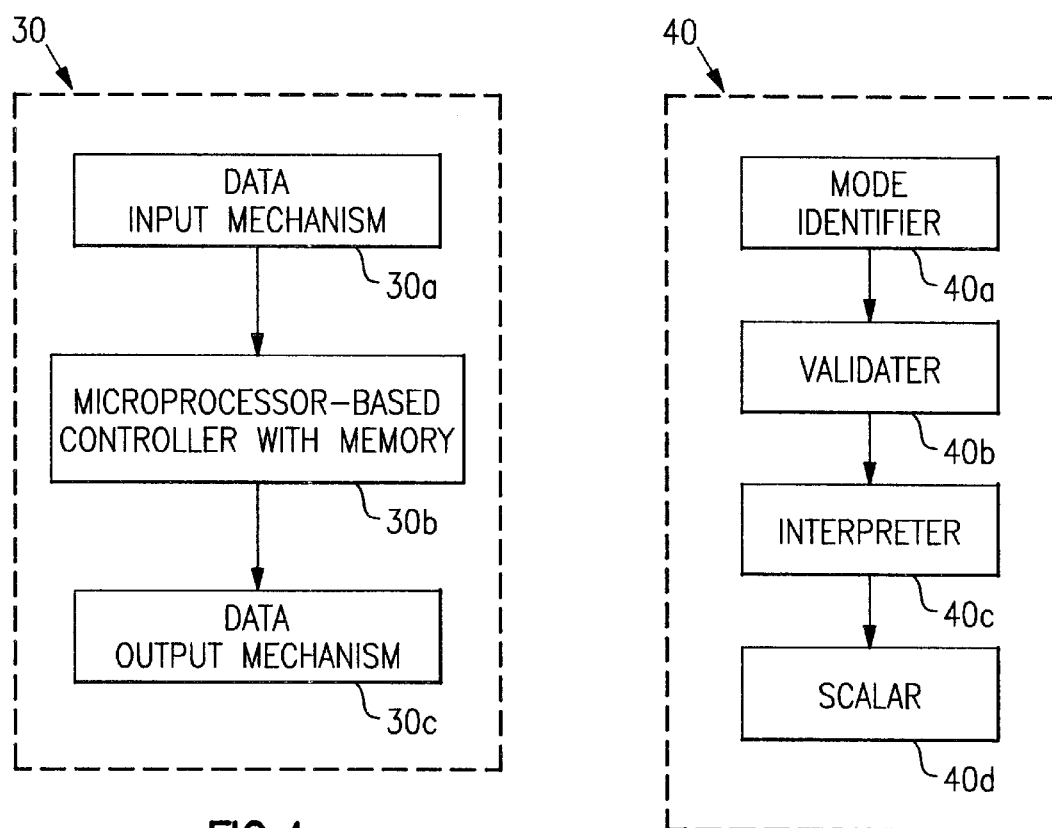
FIG.4
FIG.6

FIG.15

TRUE COOK PLUS+(RM) CODE DESIGNER ALPHA 1.1

90

COMPANY: YOUR COMPANY NAME
LOCATION: YOUR LOCATION
USER: DAVE
DATE: APRIL 17, 1937

COOK PROFILES: 3 HIGH NONE (SMALL FROZEN FOOD)

PRODUCT NAME: ACTION COOK POCKET
PRODUCT SKU: 123456789
TYPE: ENTREE-SINGLE COMPONENT
WEIGHT: 6.0 oz
PACKAGE SHAPE: HEIGHT LESS THAN 1-1/4
PACKAGE ACTIVITY: PASSIVE

PACKAGE FOOTPRINT: LENGTH 3  WIDTH 3  DEPTH 1  DIAMETER 0

ENTER COOKING TIMES
POWER [#][#]:##
HIGH  ####  00:45
NONE

GENERATE  SAVE  PRINT  CLEAR ALL  HELP  QUIT

RESULTS: 401

METHOD AND APPARATUS FOR MANAGING THE THERMAL ACTIVITY OF A MICROWAVE OVEN

CROSS-REFERENCE TO RELATED INVENTIONS

This application is a continuation-in-part application of copending applications Ser. No. 08/647,568, filed May 14, 1996 now U.S. Pat. No. 5,812,393, and Ser. No. 08/840,526, filed Apr. 21, 1997 now U.S. Pat. No. 5,883.801.

FIELD OF THE INVENTION

The present invention relates generally to a system for physical or chemical process control. The invention is directed to an interpretive BIOS machine for controlling a chemical or physical process such as heating an object or objects, i.e., food, within a microwave oven. The interpretive BIOS machine controls the course and sequence of a physical, chemical, or thermodynamic process stream, such as the heating of food articles within a microwave oven. The invention in particular is directed to a Work Manager that controls the work performed on a specimen disposed within the confines of the microwave oven. The invention is more particularly directed to a Cold Oven Manager in communication with the Work Manager to manage the thermal aberrations of the microwave oven.

BACKGROUND OF THE INVENTION

A microwave oven cooks food by bombarding the food with electromagnetic waves which cause molecules in the food to vibrate billions of times per second. The heat is created when dipolar molecules (such as water) vibrate back and forth aligning themselves with the electric field or when the ions migrate in response to the electric field.

The vibrations cause heat by friction, although only at a depth of about 1 to 1.5 inches. Heat transfer properties of food continue the process of cooking by transmitting heat to areas of the cooking food that are relatively cool in comparison to the areas that have been heated by the electromagnetic waves.

Convenience of the microwave oven and reduced preparation time are key factors in the success of the microwave oven. Taste and quality of the food after being cooked in the microwave oven were at times lacking with early models because of inconsistent voltage management, inaccurately controlled magnetron tubes, and imperfect software control. Convenience was also lacking because as the demand for microwavable food increased so did the complexity of instructions for cooking that food. Imprecision of cooking instructions was fostered by, among other factors, the differing user interfaces. Other factors include operational characteristics of dissimilar and similar sized microwave ovens and allied microwave oven operational control and user interface disparities. Consumers want the convenience of microwave cooking but do not want to constantly refer back to a package to enter and re-enter multi-step instructions into a microwave oven to obtain cooked food, and still, after all their efforts receive sub-standard cooking results due to microwave oven operational and performance variances.

Because of more active lifestyles and less time spent in the kitchen, consumer demand for microwavable products is increasing along with the demand for a microwave oven that does not require a plurality of instructions to cook food, or different instructions for the same food item for different size and/or manufactured microwave ovens. Complicating the issue of product demand and usable microwave ovens is the wide variance in magnetron output power, performance variances, and user control interfaces now prevalent in the available universe of microwave ovens. A food product that may cook very well in a 1200 watt oven may take three times as long in an oven which can only provide 600 watts of power. Moreover, the user interface from microwave ovens of one manufacturer to another is often markedly different and non-intuitive.

Further complicating the issue of the wide variation in magnetron tube output power is the local utility (power company) that supplies power to the microwave oven of the user. Utility companies are often unable to balance adequately user demand for power with available power generation capability. The effects of power fluctuations on a microwave oven are numerous. In particular, the suggested cooking instructions for a particular food becomes meaningless. An example of this would be a power fluctuation of 6% by the public utility or power generation source for a brief period of time. The results of the degradation of power supplied to the microwave oven will be food that is undercooked. This may very well result in health hazards to the consumer of the food cooked in a microwave oven if bacteria are not killed by sufficient cooking. The sensitivity of output power to line voltage is a source of concern to the microwave oven food developer as well as the consumer. Measured power as a function of line voltage is shown in FIG. 18 for three commercially available microwave ovens. Note the variation of the 500 watt number two oven indicating a 6% change in line voltage. The output power of the magnetron tube of the microwave oven has decreased from 500 watts to 375 watts. Also, note the non-linear relationship between line voltage and power output of the magnetron tube of the microwave oven. This non-linear relationship will produce wide swings in output power due to rather small changes in line voltage (*Microwave Cooking and Processing*, Charles R. Buffler).

Microwave ovens presently in use employ various data entry mechanisms to input data into an oven control mechanism. These data entry mechanisms may be electrical and mechanical keyboards, card readers, light pens, wands, or the like. The control mechanism may be a computer or a microprocessor based controller. In general, the computer or controller has a basic input and output system (BIOS) associated with the input and output of data to and from the data entry mechanism. In such microwave ovens the user manually actuates the data entry mechanism to enter data relating to the type or mode of oven operation desired, i.e., bake, roast, re-heat, etc., as well as the length of the desired cooking time.

Present microprocessor-based controllers are capable of receiving a substantial amount of complex information from their associated data entry mechanism. This requires the oven user or process stream designer to manually enter a substantial amount of information generally in a multi-step series of data inputs on a keyboard. This information could be entered by a magnetic card containing all of the required input data, but this type of format does not allow flexibility in changing the cooking instructions. Alternately, user input could recall a stored recipe specific to a particular food item. Those familiar with the art can understand that an item-specific stored recipe system is static and inherently limited to the universe of food items known to its author at its moment of creation. Such a system is closed to food items or processes created subsequent to its moment of manufacture. Such a system is a stored recipe system specific and limited to a single host microwave oven or process stream.

In the manufacture of consumer appliances, such as microwave ovens, it is advantageous to assume that the overall control requirements are nearly the same from model to model. This is done to reduce the cost of manufacture of the microwave ovens and make the repair of the ovens more economical. The functions of the microwave oven such as "auto cook," "auto defrost" and a number of other cooking parameters associated with these functions vary from model to model, depending upon such factors as microwave cavity size, magnetron size, and other factors well known to practitioners in the art. Thus a controller may be required to operate correctly in different microwave oven chassis having different oven cooking cavities. Typical oven cavity size ranges from about 0.5 cubic feet to about 2.0 cubic feet. The ovens also may vary in their effective magnetron power output, one to another of the same model, and for a single oven from one use to another, depending on the electrical power supplied to it.

A well-known oven output power phenomenon concerning the mass of a specimen is documented in the IEC 705 publication. This publication defines a procedure for determining the output power of a microwave oven. Following the IEC 705 procedure a 1000 ml specimen of water is placed in a microwave oven. Power is applied to the specimen by the magnetron tube. The water boils at a specific power level in a given time period. The results of this test generated a classification of 800 watts for this particular microwave oven.

To further explain the phenomenon another test may be constructed following IEC 705 procedures. A specimen containing 250 ml of water is placed in the same microwave oven that was used to test the 1000 ml specimen and power is applied to the specimen. Performing the same calculations as before the microwave oven now appears to be a 660 watt oven. This particular phenomenon clearly asserts the specimen mass has a pronounced effect on determination of the power rating of the microwave oven.

Microwave power output can be controlled using two methods. The first is duty cycle control and the second is amplitude modulation. In duty cycle control, the average output can be adjusted by operating the magnetron at full rated power, while switching its current on and off for portions of a time interval. The percentage of time that the current is on during the time interval is referred to as the "duty cycle."

The duty cycle of the microwave oven is generally implemented by electromechanical relays in conjunction with the controls of the microwave oven. The relays provide economies of scale for a manufacturing effort but they do not adequately provide competent electrical current switching.

Magnetron power output is proportional to its cathode current. In amplitude modulation, the cathode current is adjusted to control the instantaneous magnetron output. The instantaneous magnetron current is controlled either by varying the level of high voltage to the magnetron or by changing the magnetic field intensity in the magnetron.

Attempts in the past have been made to monitor magnetron tube power and compensate for the fluctuations in power produced by the magnetron tube. It is well known in the art that power produced by a magnetron tube and delivered to a sample in a thermally cold oven is substantially different from that same magnetron tube in a thermally hot oven. A thermally cold oven is defined to be a microwave oven that has zero percent (0%) microwave emission for an extended period of time measured at ambient temperature. A thermal hot microwave oven is defined to an oven that has had one hundred percent (100%) microwave emission for an extended period of time. An example of thermal activity or lack thereof would be a microwave oven at 0% or 100% microwave emission that has thermally stabilized both within the magnetron and within the cooking cavity at room temperature. The period of stabilization may range up to several hours depending on numerous thermal conductive variables in place on or near the microwave oven that may produce thermal cooling thereby affecting the thermal stabilization of the microwave oven. In general and in normal households the microwave oven will thermal stabilize at 0% microwave emission in about one to three hours. It is also well known in the art that when the operating temperature of a magnetron tube increases the power produced decreases. The operating temperature of the magnetron tube will increase due to normal operation. The heat produced by the specimen contained within the microwave oven having work performed thereon will also increase the temperature of the magnetron tube and the cooking cavity. The specimen does not consume 100% of the power generated by the magnetron tube; therefore, some of that power will be radiated outwardly from the specimen in the form of heat. Given the close proximity of the magnetron tube to the specimen the magnetron tube operating temperature will undoubtedly increase.

Monitoring the output of the microwave oven and then increasing input power to raise the power output of the magnetron tube is a self-defeating effort. As more power is supplied to the magnetron tube the power output of the magnetron tube increases, but the efficiency of the magnetron tube decreases, thereby increasing the operating temperature. This means the input power should be increased to compensate for the decrease in output power. This process will continue until a maximum input power is achieved thereby saturating the magnetron tube and further decreasing efficiency of the magnetron tube.

Another method of monitoring power output of the magnetron tube is to compare the monitored value of power to the power being delivered to the microwave oven by the power utility company. If these values do not compare after subtracting known losses, a compensation factor extracted from a lookup table has to be determined. This determined correction factor is mechanically or electronically applied to the magnetron tube. Applying this factor in this manner will increase or decrease the amount of power delivered to the magnetron tube. This is a self-defeating effort. If the magnetron tube power is too high the magnetron tube operating temperature will increase causing a decrease in efficiency, as discussed above. This results in a new compensation factor being applied to the magnetron tube power level. This cycle of applying correction factors and adjusting power levels will continue and the result of this effort will not correct the work performed on the specimen disposed within the microwave oven.

It is a well-known principle of physics that when a force does work on an object it must increase the energy of that object by a like amount (or decrease if the work is negative). When an object loses energy of any form, it must experience a like increase in energy of some other form, or it must do a like amount of work. Power discussed herein is the time rate of doing work. Power is expressed as an equation: Work=Power×Time.

Microwave ovens having compatible hardware can interact and share data. It has been possible in the past to exchange software between identical types of machines. To the contrary, most interactions between incompatible machines still involve little more than simple transfer of data files or the like. Software applications written for one microwave oven manufacturer or for one specific type of operating environment, however, cannot normally be ported or "transferred" to a system having different physical characteristics without being entirely rewritten. While much progress has made in developing techniques for exchanging data between incompatible machines, it has not been possible to exchange software application programs between different microwave ovens.

Data presented in the form of recipe instructions that offer static cooking conditions differ on characteristics of the material to be cooked. The material inherently varies in dielectric property, relative dielectric constant, and loss factor. These properties govern both the heating rate and uniformity, the latter being influenced by the depth of penetration of the microwave energy. Accordingly, conventional fixed cooking program functions do not allow the entry of data concerning the conditions of the material to be cooked into memory of the computer or controller of a microwave oven. As a result two materials would be cooked under the same cooking conditions in spite of having different material characteristics and cooking profiles. This causes an undesirable cooking operation.

It would be desirable to have a microwave oven or process control system that could accept pre-defined user entered programming information that could be interpreted and scaled to varying magnetron performance or process performance level(s) and power level duration(s) specific to a particular host unit. As the result of a single user entered pre-defined code, the final end result of a process performed for a particular item would be independent of and produce identical results upon the item regardless of the functional operating characteristics of any particular host microwave oven or process stream into which the user entered pre-defined code is input.

SUMMARY OF THE INVENTION

The present invention provides an interpretive BIOS machine for controlling the cooking of food or performance of a chemical, physical, or thermodynamic process in any of a plethora of variously sized host microwave ovens or disparate process streams in response to a predetermined code. The present invention allows a host microwave oven or process stream to functionally operate by user independent commands. In the preferred embodiment a system controller is operatively disposed intermediate a data entry mechanism, provided for the entry of a predetermined BIOS interpretable and scaleable code, and the host microwave or process stream. The controller has a central processing module, a memory module, and a plurality of input and output devices to send and receive data to and from the host microwave oven and the data entry mechanism. The interpretive BIOS machine is operatively embedded in the controller's memory.

The interpretive BIOS machine has a plurality of data structures that have data determined by the predetermined code. These data structures provide the controller with instructions to command and control the host microwave oven or process stream, whereby the host microwave oven or process stream operates with user independent functional commands.

The present invention contains interpretive data structures that provide both factory-selected and user defined scalars, altitude, calibration factors and selection of the mode of operation. The calibration data structures allow the user of the present invention to scale the power level and/or the power level duration of the host microwave oven or process in response to performance degradation with age of the magnetron tube, process elements or variations of host unit in-situ elevation above mean sea level. The selection mode also allows the user of the host microwave oven or process stream to use the present invention to operate the host microwave oven or process stream in its original conventional mode of operation.

A second embodiment of the present invention is a Work Manager disposed within the BIOS machine. The Work Manager controls the work performed on a specimen disposed within the confines of a Work Manager oven. The Work Manager is implemented by a controller. The controller has a memory for storing a software program or a plurality of data structures that provide commands and functions for the operation of the Work Manager. The controller also has at least one sensor operatively connected within the microwave oven for detecting the power consumed by the microwave oven magnetron tube. The sensor periodically transmits selected power data to the BIOS machine for processing. A predetermined code is determined from the specimen and entered by the user into the microwave oven. The predetermined code delineates a work characteristic cooking instruction set particular to the selected specimen. The interpretive BIOS machine receives the predetermined code. The BIOS machine also receives power data periodically transmitted from the power sensor for processing. The power data and the predetermined code are processed by the Work Manager. An instruction set is generated by the Work Manager. The instruction set transforms the power data and the predetermined code into commands for work to be performed on the specimen by the microwave oven. The result of this operation will be that the microwave oven magnetron tube (or physical, chemical, or thermodynamic process stream) delivers the required work to the sample independent of power supplied to the microwave oven.

A third embodiment of the present invention is a Code Maker. The Code Maker receives selected work characteristics particular to a specimen disposed in a microwave oven requiring work to be performed thereon. The output of the Code Maker is a selected predetermined code. The format of the code is a selected symbol representing the code. The predetermined code encapsulates a profile indicative of the work to be performed on the specimen. The profile is selected from a group consisting of required specimen heating time(s), specimen geometry, heating power levels, specimen mass, the specimen material composition, and the like.

A fourth embodiment of the present invention is a Cold Oven Manager disposed within the BIOS machine. The Cold Oven Manager controls the thermal aberrations of a microwave oven. The Cold Oven Manager is in communication with the Work Manager to effectively manage the work and thermal condition of a microwave oven. The Cold Oven Manager may, if desired, function independent of the Work Manager to control the thermal aberration of a microwave oven or the like. The Cold Oven Manager is implemented by a controller. The controller has a memory for storing a software program or a plurality of data structures that provide commands and functions for the operation of the Cold Oven Manager. The controller receives information from the BIOS machine as to the thermal activity of the microwave oven. A predetermined code is determined from the specimen and entered by the user into the microwave oven. The predetermined code delineates a work characteristic particular to the selected specimen. The interpretive BIOS machine receives the predetermined code. The BIOS machine also receives power data periodically transmitted from a power sensor for processing. The power data and the predetermined code are processed by the Work Manager. The Work Manager communicates with the Cold Oven Manager requesting updated or time compensated thermal data. The Work Manager receives the requested data from the Cold Oven Manager and processes it along with other pertinent data. An instruction set is generated by the Work Manager. The instruction set transforms the power data, time compensated thermal data and the predetermined code into commands for work to be performed on the specimen by the microwave oven. The result of this operation will be that the microwave oven magnetron tube (or physical, chemical, or thermodynamic process stream) delivers the required work to the specimen independent of power supplied or initial thermal conditions of the microwave oven.

Accordingly, an object of the present invention is to provide a BIOS that will enable or allow transfer of software application across incompatible hardware and operating system environments, the result of which is identical heating or process result upon a specimen regardless of the power output capacity and power performance capability of the particular performing microwave oven, or physical, chemical, or thermodynamic process stream.

Another object of the present invention is to provide a BIOS that allows a set of semantic and syntactic rules that determines the behavior of functional units in achieving communications across application programs and dissimilar microwave ovens or process streams.

Another object is to enable food manufacturers, cookbook authors, chemical or physical or thermodynamic process designers and so forth to express complex processing instructions from within a universal BIOS interpreter and host unit internally scaleable user friendly (yet functionally rich when interpreted by the BIOS) symbolic code.

Another object is to manage the work performed on a specimen placed in a microwave oven so as to produce a heating or process result upon a specimen identical to the result produced within other differing microwave ovens (or chemical, physical, or thermodynamic process streams) of varied performance output capabilities, or like microwave ovens or process streams of differing age(s) or in situ elevation(s), all operating under widely varied supplied power conditions.

Another object is to manage the thermal activity or inactivity of a microwave oven so as to produce work performed upon a specimen independent of the power dissipation of the microwave oven or like.

Other objects, features and advantages of the present invention will become apparent upon reading the following detailed description of embodiments of the invention, when taken in conjunction with the accompanying drawings and the appended claims.

BRIEF DESCRIPTION OF THE DRAWINGS

The invention is illustrated in the drawings in which like reference characters designate the same or similar parts throughout the figures of which:

FIG. 1 illustrates a schematic view of a host microwave oven,

FIG. 2 illustrates a block diagram showing a symbolic code being entered into the keypad of FIG. 1

FIG. 3 illustrates the present invention disposed intermediate the key pad of FIG. 1 and the controller of the host microwave oven, FIG. 4 illustrates a block diagram of an interpretive BIOS machine, FIG. 6 illustrates the architecture for interpretive BIOS machine of FIG. 5, FIG. 15 illustrates a Code Maker computer screen tool for capturing the work requirements of a specimen.

DESCRIPTION OF THE PREFERRED EMBODIMENTS

Figure 5:
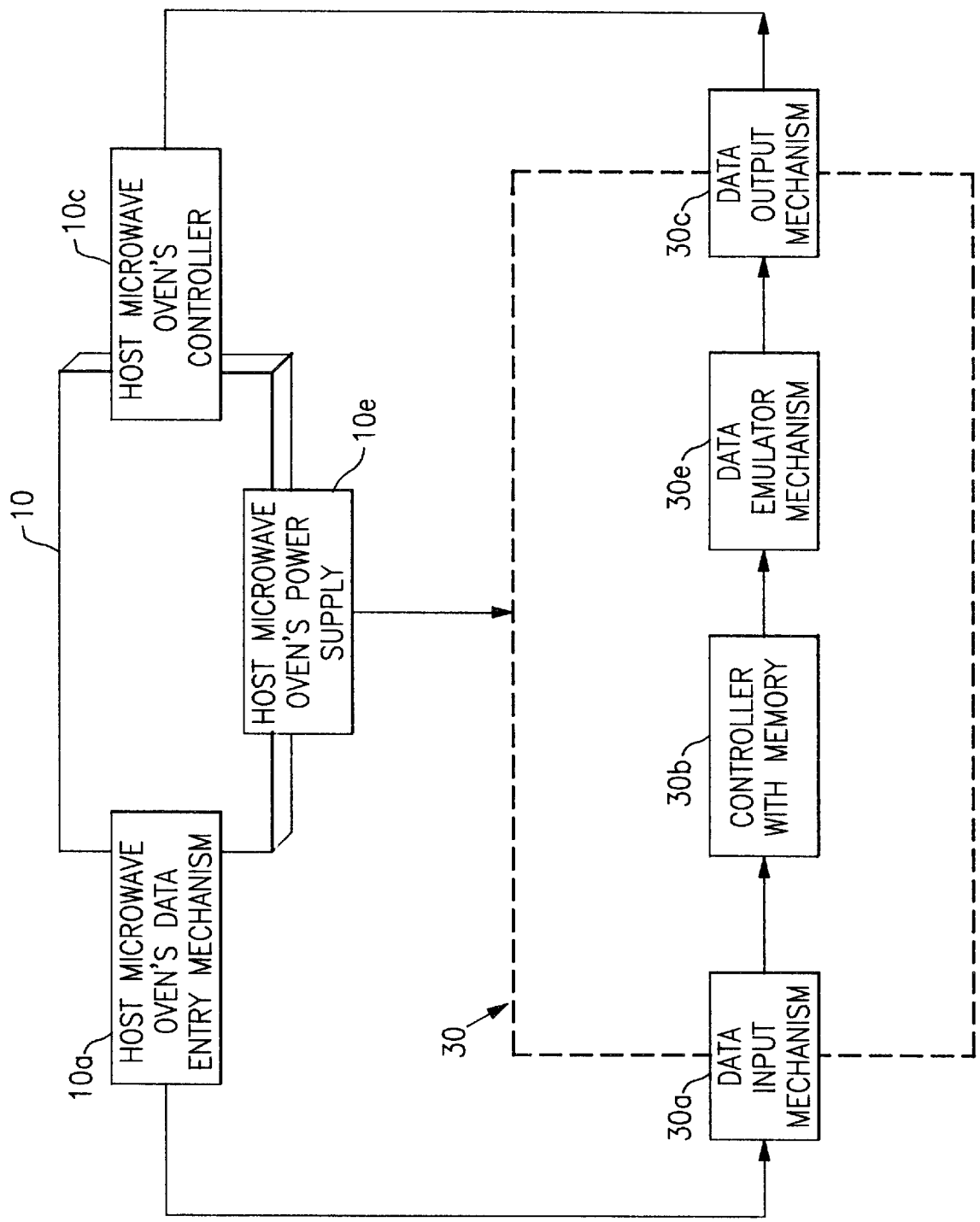
FIG. 5 illustrates a block diagram of the interpretive BIOS machine connected to the host microwave oven.
Figure 7:
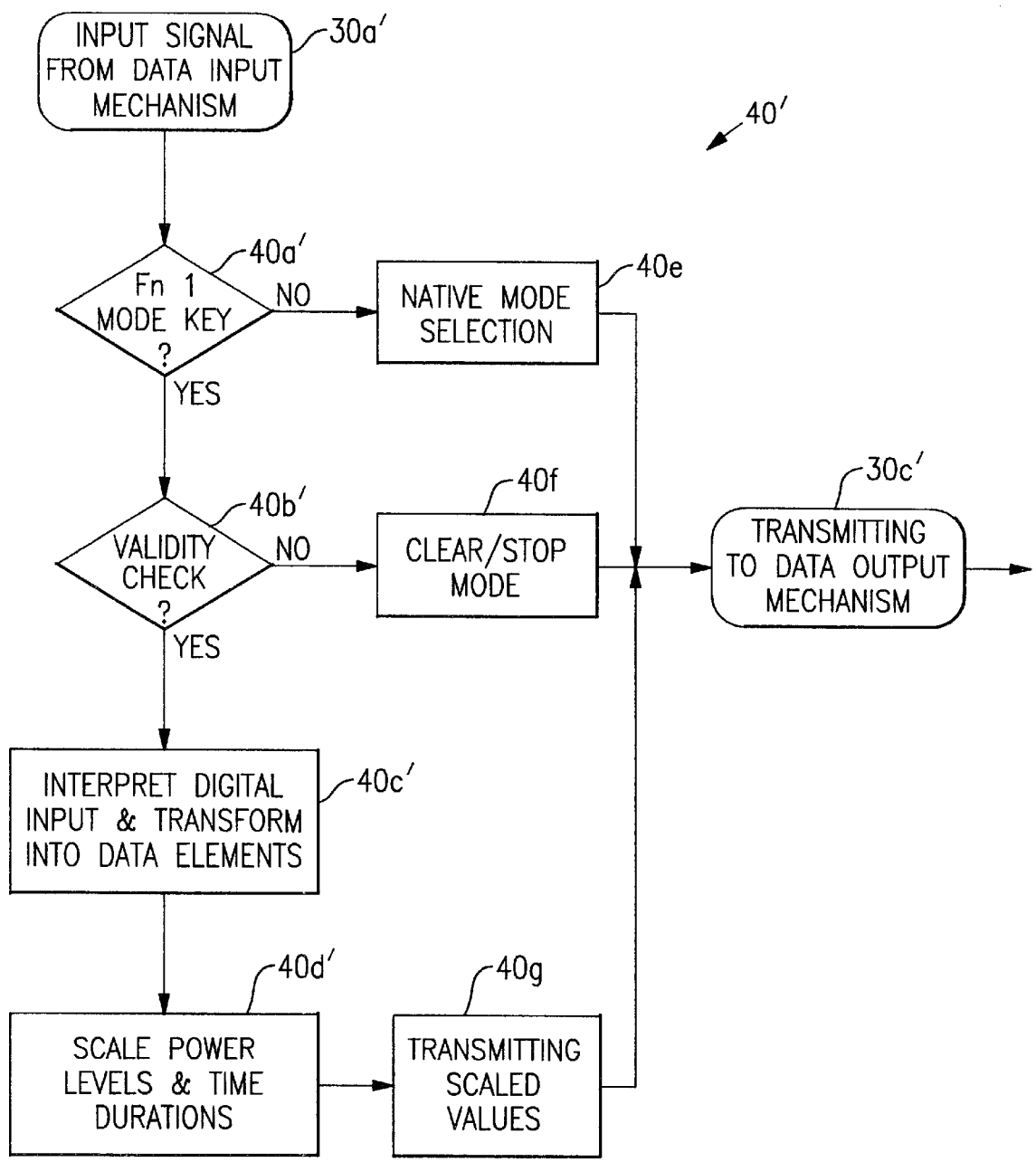
FIG. 7 illustrates a flow diagram of FIG. 6.

The interdependence of the element numbers of the drawings has been referenced above and for the convenience of the reader will be reiterated here by citing an example of the flow of element numbers to drawings. This example is intended for illustrative purposes only: interpretive BIOS machine 30, FIG. 3, is further illustrated in a block diagram 30, FIG. 5. The architecture for interpretive BIOS machine 30, FIG. 5, is generally illustrated at 40, FIG. 6. Architecture 40 is further illustrated at 40', FIG. 7. Mode key 40b', FIG. 7, is further illustrated at 40b', FIG. 8, containing elements 40b'a to 40b'f.

FIGS. 1–3 illustrate a typical microwave oven 10 used by households, restaurants, and other types of institutions that prepare and cook food. An example of a typical microwave oven is a microwave oven manufactured by Cober Electronics, Inc., although any microprocessor, computer, or ASIC (Application Specific Integrated Circuit) controlled microwave oven or process stream is usable and operable in conjunction with the present invention. Microwave oven 10, for the purposes of illustration only, will host the present invention.

Host microwave oven 10 has a data entry mechanism 10a, a display 10b, and a computer or controller with memory 10c, as shown in FIG. 3. Data entry mechanism 10a may, if desired, be any type of data entry mechanism suitable for inputting data into host microwave oven 10. Data entry 10a mechanism may, if desired, transmit its data by serial or parallel format using any type of transmission medium such as, but not limited to, key pad entry, bar code reader, modem, computer or telephonic communications network or any other medium that allows transmission of data. An example of data entry mechanism 10a would be a key pad part number KBD-KPX17P, manufactured by Alps, San Jose, Calif.. Data entry mechanism 10a for the purposes of illustration only will be discussed as a conventional touch responsive key pad known to those of ordinary skill in the art, although any data entry mechanism will function in conjunction with the present invention. Data entry mechanism 10a has at least one mode key. If desired, a plurality of mode keys may be implemented in conjunction with the present invention. For the purpose of illustration only, key Fn-1, 10d, of data mechanism 10a will indicate the desire by the user of microwave oven 10 to enter a selected predetermined code 20, as shown in FIG. 2. Selected code 20 represents a predetermined instruction set for heating or cooking a manufactured food item 20a. This predetermined code may, if desired, be listed in a recipe cook book 20b containing a plurality of predetermined codes. The cook book 20b may, if desired, contain selected codes along with conventional cooking instructions. Selected code 20 may, if desired, be comprised of at least one numeral, letter or symbol. An example of selected code 20 is a series of seven numbers. Manufactured food item 20a may require a plurality of processing steps to fully cook the foodstuffs properly. In this particular case selected code 20 may represent any combination of process, steps of cooking, or cookbook recipe. Ordinarily, the code 20 will be printed on or otherwise associated with the food packaging. Alternatively, a book of codes 20 can be assembled and provided to the user, most likely by the manufacturer of the food, a cookbook author, or process designer.

The preferred embodiment of the present invention is an interpretive BIOS machine illustrated generally at 30, as shown in FIG. 3. Interpretive BIOS machine 30 is operatively disposed between the data entry mechanism 10a of the host microwave oven 10 and controller 10c. Interpretive BIOS machine 30 receives and processes selected code 20 and then outputs its interpreted and scaled instruction set to controller 10c. The interpreted instruction set provides host microwave oven 10 with user independent instructions for the cooking of food items desired by the user. The interpreted instruction set may contain one or a plurality of data fields that will compensate for variations in oven magnetron power, other similarly sized magnetron tube microwave oven performance variations, in-situ microwave oven elevation above sea level, aging of the host microwave oven, and the variation of cooking recipe requirements.

A top level illustration of interpretive BIOS machine 30 is shown in FIG. 4. Interpretive BIOS machine 30 comprises a data input mechanism 30a, a microprocessor base controller 30b, and a data output mechanism 30c. As shown in FIG. 5, interpretive BIOS machine 30 receives its operational power from power supply 10e. Data input mechanism 30a comprises a buffer that connects the output of data entry mechanism 10a of host microwave oven 10 to the input of controller 30b. An example of this buffer is at least one Hex Non-inverting Buffer, MC14050b, manufactured by Motorola, Inc., Phoenix, Ariz.. Controller 30b commands and controls all the operational functions of the present invention. An example of controller 30b that may, if desired, be used in conjunction with the present invention is MC68HC11 manufactured by Motorola, Inc. This particular controller has an on-board memory used for storing data structures that provide controller 30b with instructions as to the operational features of the present invention. Data emulator mechanism 30e is connected to controller 30b and receives encoded instructions from controller 30b. Data emulator 30e transforms those encoded instructions into suitable data for controller 10c. An example of a data emulator is a plurality or bank of operationally connected CD 5053 or CD 4051 devices. The output of data emulator 30e is connected to data output buffer 30. The output of mechanism 30c is connected to controller 10c. Interpretive BIOS machine 30 is completely buffered from host microwave oven 10 and is transparent to the user of host microwave oven 10. This buffering allows host microwave oven 10 to operate utilizing the present invention or to operate in the native mode, i.e., receiving data inputs directly from the user. The architecture for interpretive BIOS machine 30 is generally illustrated at 40, as shown in FIG. 6. Architecture 40 contains a plurality of data structures that have their data determined in part by selected code 20 and in part by the interaction between respective data structures. These data structures provide controller 30b with instructions to command and control the host microwave oven 10 thereby allowing host microwave oven 10 to function independent of user commands.

Mode Identifier data structure 40a, as shown in FIG. 6, receives its data from data entry mechanism 10a. Mode Identifier data structure 40a has data elements that determine if the interpretive BIOS machine is requested for activation or if the user of host microwave oven 10 desires to operate the oven in its native mode. Native mode, once detected by Mode Identifier data structure 40a, operates without the assistance of interpretive BIOS machine 30. Mode Identifier data structure 40a passes the request for BIOS machine activation to Validator data structure 40b. Validator data structure 40b has elements that determine the validity of the input code 20 selected by the user. If Validator data structure 40b determines that selected code 20 is valid, data structure 40b will pass that result to Interpreter data structure 40c. Upon receiving Validator result, Interpreter structure 40c will transform user input code 20 into a data element set containing a plurality of data fields representing the requested duration and power level process instruction set of the selected code 20. Interpreter structure 40c may, if desired, transform user input code 20 into a data element set containing a plurality of data fields representing requested time duration and variable power level process instruction set of selected code 20.

Scalar data structure 40d receives the data element set from Interpreter data structure 40c. Scalar data structure 40d transforms those data fields into suitable duration and power level requirements depending on the oven manufacturer's predetermined selection of scaling factor and additional user defined scale factor(s). Scaling factor(s) will be disclosed in greater detail below. The scale duration and power data elements are encoded into a format that is understood by the host microwave oven 10.

FIG. 7 shows a logical flow diagram, indicated generally as 40' of the operational features of the interpretive BIOS machine 30 provided by architecture 40. An input data signal 40a' is received from host microwave oven 10. This input may, if desired, be accompanied by data generated by the user depressing the Fn 1 mode key 10d at least once. The mode of operation selected by the user is now determined. If Fn 1 10d is present the interpretive BIOS machine 30 has been selected. If Fn 1 10d is not present the native mode has been selected by the user and that selection 40e is transmitted to host microwave oven 10. The validity 40b' of input data signal 30a' is now verified. If there is user error in input data signal 30*a'* the user will be notified by instructions that appear on display 10*b*. If inaccuracies in data signal 30*a'* cannot be resolved, the validity check 40*b'* will default to a clear/stop function 40*f* and transmit that signal to the native mode of host microwave oven 10. If validity 40*b'* is verified, data signal 30*a'* is interpreted 40*c'* and transformed into data element set 40*c'* containing power levels and time duration (s). Data element set 40*c'* is then scaled at block 40*d'* to the operating characteristics of host microwave oven 10. Those scaled values 40*d'* are then transmitted at block 40*g* to host microwave oven 10 for implementation in the process of cooking food item 20*a*.

Figure 8:
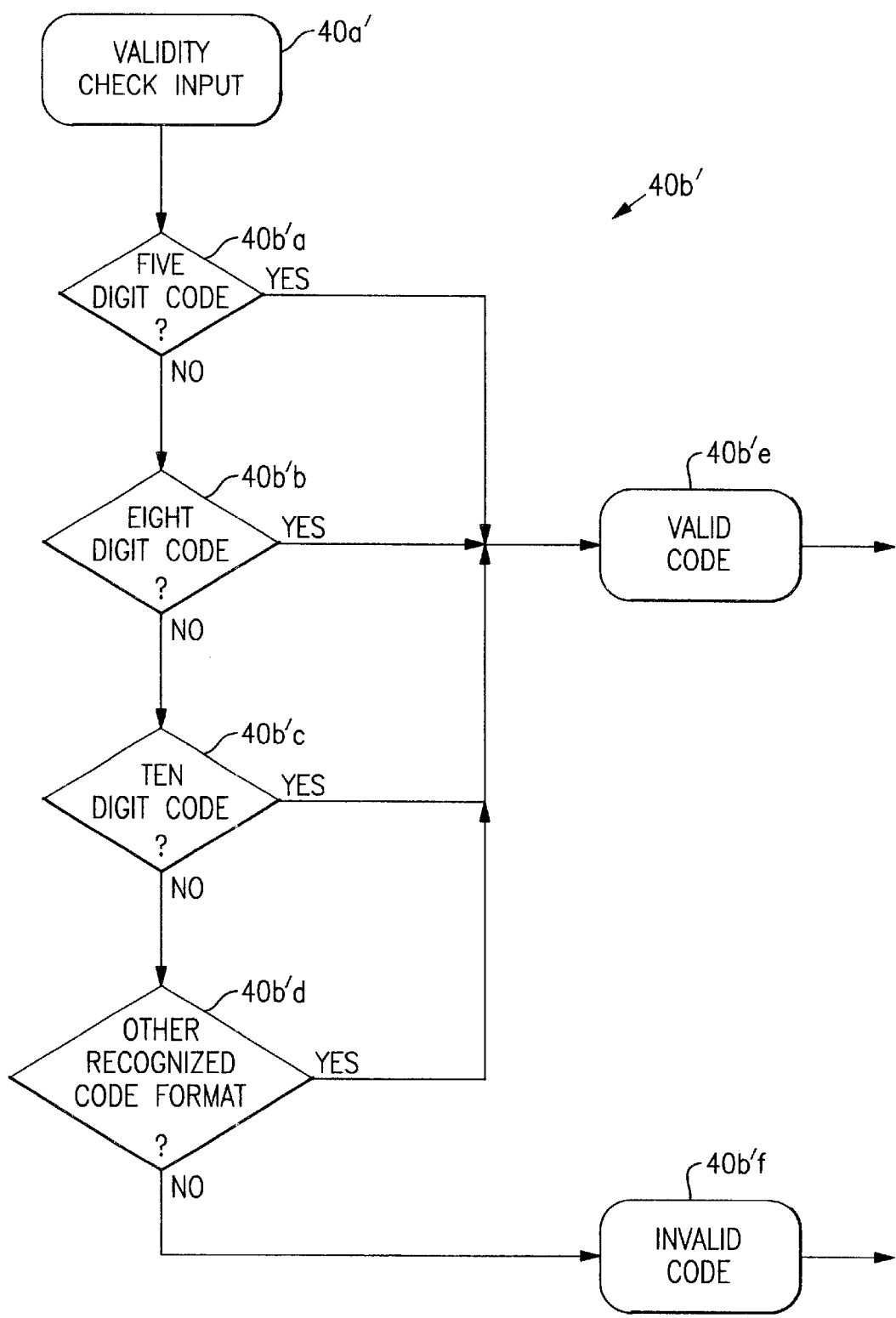
FIG. 8 illustrates a flow diagram of the validator of FIG. 6.

FIG. 8 shows a more detailed diagram 40*b'* of validation data structure 40*b*. Mode function 40*a* transmits an encoded data stream that is received by validated data structure 40*b'*. This data contains at least one data bit and may, if desired, contain a plurality of data bits. In one of many preferred embodiments, a five digit code at block 40*b'a* is transmitted by mode function at block 40*a*. This transmission is for illustrative purposes only. In fact, any number of digits may be transmitted. An eight digit code at block 40*b'b*, a ten digit code at block 40*b'c*, and other Interpretive BIOS Machine recognized code format(s) at block 40*b'd* may be transmitted. If the code at block 40*b'e* is valid it is transmitted to Interpreter data structure 40*c*. If the code at block 40*b'f* is invalid, a clear/stop function is transmitted to host microwave oven 10.

Figure 9:
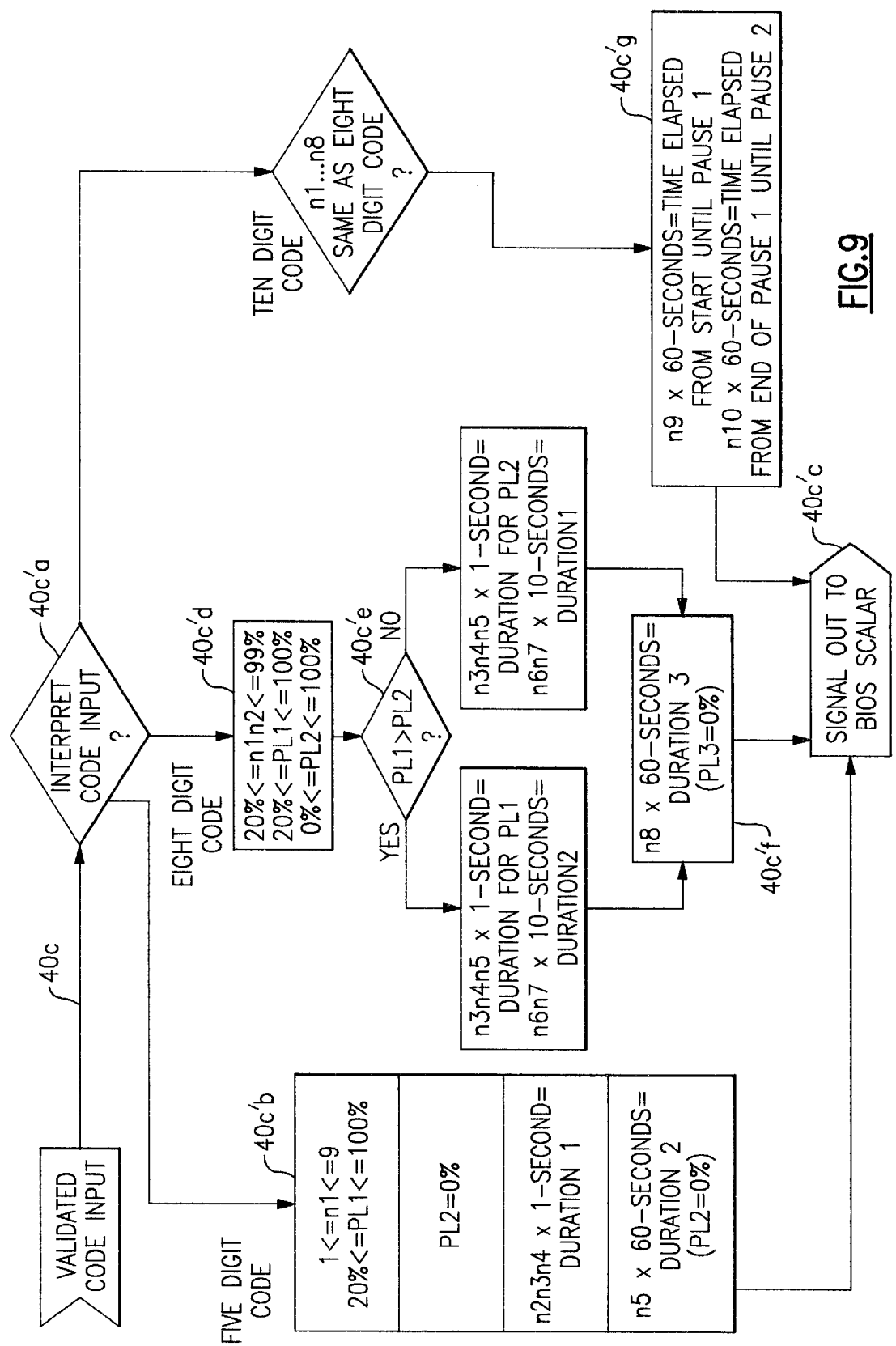
FIG. 9 illustrates a flow diagram of the interpreter of FIG. 6.

FIG. 9 shows a more detailed diagram of Interpreter data structure 40*c* illustrated at block 40*c'*. A validated code at block 40*b'e* is received and the code input is interpreted at block 40*c'a* as being a five, eight, or ten digit code. If the interpreted code is five digits at block 40*c'b*, the first digit n1 is equal to or greater than one and equal to or less than nine and is interpreted by the BIOS to Power Level 1 (PL1), expressed as a percentage of the magnetron tube's total output capacity; i.e., 100%, 90%, and so forth. For a five digit code power level PL2 is equal to 0%. PL1 duration is equal to the digit n2, n3, and n4 multiplied by one second. The five digit code is now interpreted and transformed into a new code representing specimen 20*a*'s requirements for processing or cooking. This requirement for processing or cooking will vary depending on the specimen involved. This new five digit code is transmitted 40*c'c* to the scalar data structure 40*d*. If an eight digit code at block 40*c'd* is received by interpret code input at block 40*c'a*, digit n1 and n2 are equal to or less than ninety-nine and equal to or greater than twenty. Power level PL1 is less than or equal to one hundred percent and equal to or greater than twenty percent. Power level PL2 is less than or equal to one hundred percent and equal to or greater than zero percent. If PL1 is equal to or greater than PL2 at block 40*c'e*, digits n3, n4, and n5 are multiplied by one second and are equal to time duration one. Duration for PL2 is equal to digit n6 and n7 multiplied by ten seconds. If PL2 is equal to or greater than PL1 40*c'e*, digits n3, n4, and n5 are multiplied by one second and are equal to power level two duration. Duration for PL1 is equal to digit n6 and n7 multiplied by ten seconds. Time duration three is equal to n8 multiplied by sixty seconds with power level PL3 equal to zero at block 40*c'f*. The eight digit code is now decoded and transformed into a new code representing the requirement for processing or cooking of specimen 20*a*. This new eight digit code is transmitted at block 40*c'c* to the scalar data structure 40*d*. A ten digit code is transformed in much the same way as the eighth digit code except for digit n9 that is multiplied by 60 seconds and is then equal to the time that has elapsed from the start process until pause one. Digit n10 is multiplied by sixty seconds and is then equal to the elapsed time since the end of pause one until pause two. (Enablement of pause one and pause two allows for user intervention and intermediate user actions during the processing or cooking sequence.) The user determines when the pause is complete and the control program is to resume by pressing Fn 1–10*d*. Like the five and eight digit code the ten digit code is transmitted to scalar data structure 40*d*.

Alternately in FIG. 9, the code input to block 40*c'a* may range from two to ten digits in length, wherein the Interpreter data structure 40*c* may extract from the input code the sample's mass, geometry, packaging descriptor(s), starting state (i.e. frozen, shelf stable and so forth), composition, and reference oven's sample processing work requirements (i.e. power level magnitude(s), power level sequence(s), and power level(s) duration(s)) for processing the sample according to the information compiled within the block 40*b'e* validated Codemaker compiled input code; thus enabling the selection of suitable scalar(s) by the BIOS for the processing of the sample within the subject oven(s).

Scalar data structure 40*d* has both manufacturer selected and user selected components. Scalar data structure 40*d* has its manufacturer selected universe of data empirically derived from the testing of a plurality or the universe of microwave ovens. A statistically derived sample of the universe of microwave ovens was selected. The sample ovens were each tested in an environmentally controlled and reproducible atmosphere to ensure repeatability of the test due to variations in ambient temperature, humidity, and atmospheric pressure. A control microwave oven was also tested to ensure accuracy and repeatability of the test. An example of the control microwave oven is a microwave oven manufactured by Cober Electronics, Inc. The control microwave oven was tested to a control standard defined as a microwave oven containing a 1200 watt magnetron tube. The oven is placed in an environment maintained at an atmospheric pressure corresponding to that of an altitude of zero feet above mean sea level at a constant temperature of 20° C. and an ambient humidity of 80%.

Figure 10:
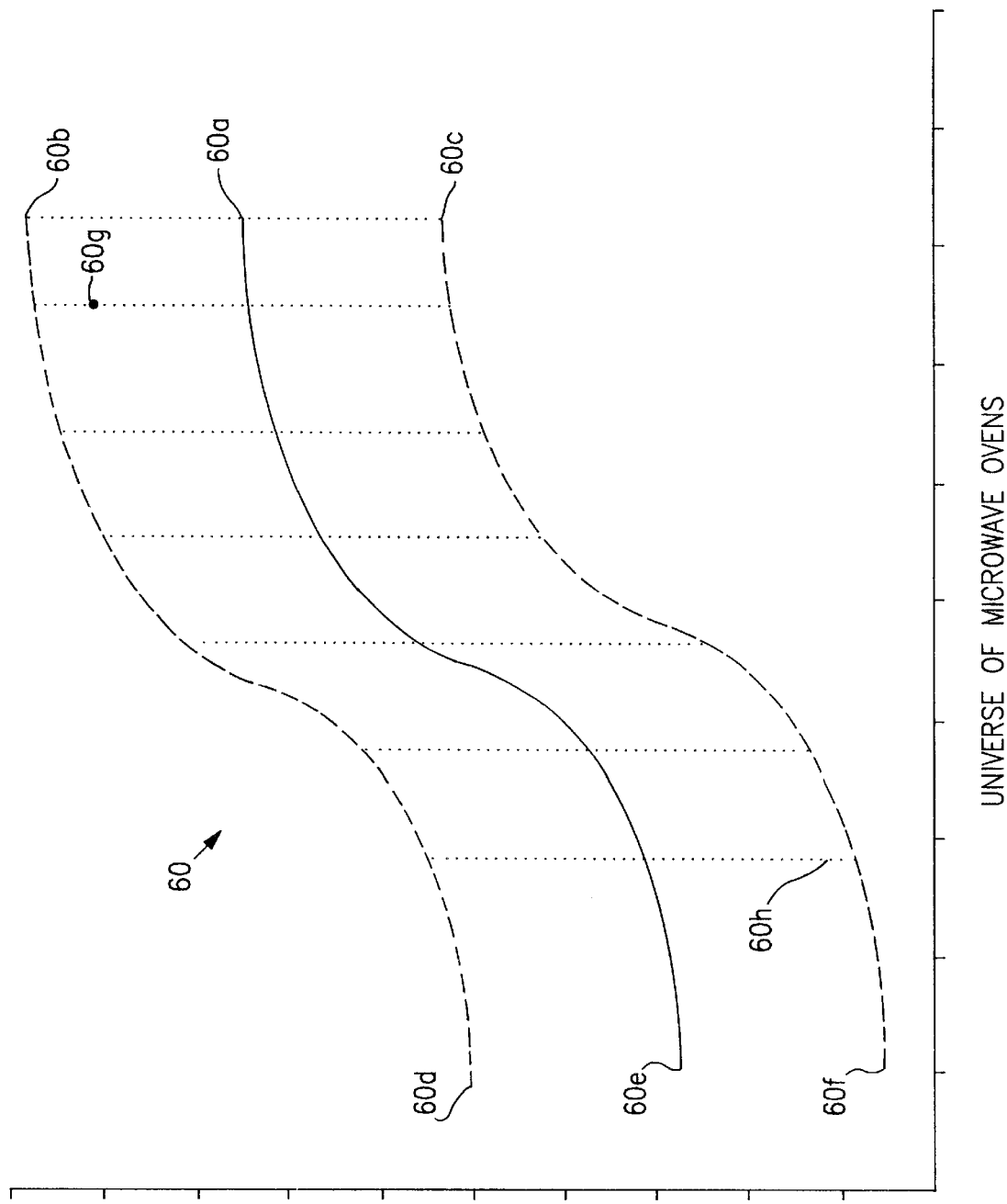
FIG. 10 illustrates a test result graph.

The test comprised a series of testing iterations, the purpose of which was to characterize a microwave oven's (or thermodynamic, chemical, or physical process stream's) effective work production (i.e., work performed upon a sample calculable in watt-seconds) when heating samples of varying mass, composition, and container dimensions and geometry. A single test upon a sample of defined mass and composition and container geometry is herein described. The test comprised placing one liter of water of specifically known and reproducible chemical composition, molarity, molality, and dielectric properties in each microwave oven with a pyrometer disposed in each liter of water. The magnetron tube of a selected microwave oven was activated and the time to raise one liter of water one degree centigrade was recorded. The results of that test are generally illustrated in graph 60 in FIG. 10. The median time range versus the universe of microwave ovens is illustrated at point 60*a*. The highest deviation from point 60*a* is illustrated at point 60*b*. The lowest deviation from point 60*a* is illustrated at point 60*c*.

Points 60*a*, 60*b*, and 60*c* can be correlated to the highest power, measured in watts, of the magnetron tube used in each test. Conversely, points 60*d*, 60*e*, and 60*f* can be correlated to the lowest power, measured in watts, magnetron tube used in this test.

A plurality of scalar values may now be determined from graph 60. Those scalar values are derived from the distance a select scalar point is to the median 60a, measured along the vertical axis of graph 60. Any number of points may, if desired, be disposed along any given vertical line extending from median line 60a. An example of that scalar value is scalar point 60g representing a value of 0.25 and scalar point 60h 4.0. The selected scalar values when applied to data element set 40c transform the power and time duration contained within data element set 40c' into operating characteristics for microwave oven 10.

To compensate for the magnetron tube (and other components) as well as the power level output degradation of microwave oven 10 over the useful life of the oven, a dynamic user-initiated BIOS calibration scalar component may be activated. The dynamic BIOS calibration updates in real time the power output operating and performance characteristics of the microwave oven 10 to the BIOS output scale level selected at the time of manufacture. A method to implement the calibration of microwave oven 10 is to depress Fn 1, 10d twice, whereupon display 10b will indicate the current BIOS operating level. By depressing Fn 1 10d simultaneously with a selected keypad number corresponding to the degree of BIOS, timed duration output scale level will increase desired scale value. An example of is be pressing 1 causes a 5% BIOS output scale level increase, pressing 3 causes a 10% BIOS output scale level increase, etc. The display will flash at least three times, indicating calibration is in process and the display 10b will now display the selected increase or decrease to the BIOS scaled value. To reset the BIOS scaled value to the original value, Fn-1 10d is depressed along with the key zero.

Another method of calibrating power level duration for microwave oven 10 is by depressing Fn 1 10d simultaneously with the start key 10e. This action will commence the National Postal Code ("zip code") BIOS calibration. Display 10a will flash the factory set BIOS National Postal Code. If this code is different than user's current postal code, the user may, if desired, enter their current National Postal Code. Interpretive BIOS machine 30 reads a stored National Postal Code corresponding to the elevation above mean sea level and the BIOS machine 30 performs a self calibration to adjust the power level duration to reflect the increase in elevation. The elevation above mean sea level may, if desired, be entered directly or a one digit direct input read from an Elevation Range-Performance Characteristic Table may be entered. In all cases interpretive BIOS machine 30 will perform a self calibration to increase or decrease the power level duration of microwave oven 10.

The user of host microwave oven 10 may now cook food item 20a without regard for type of microwave oven employed, the power or aging of the magnetron tube of the selected microwave oven, or the in-situ elevation above mean sea level of the installed microwave oven or process stream.

Figure 11:
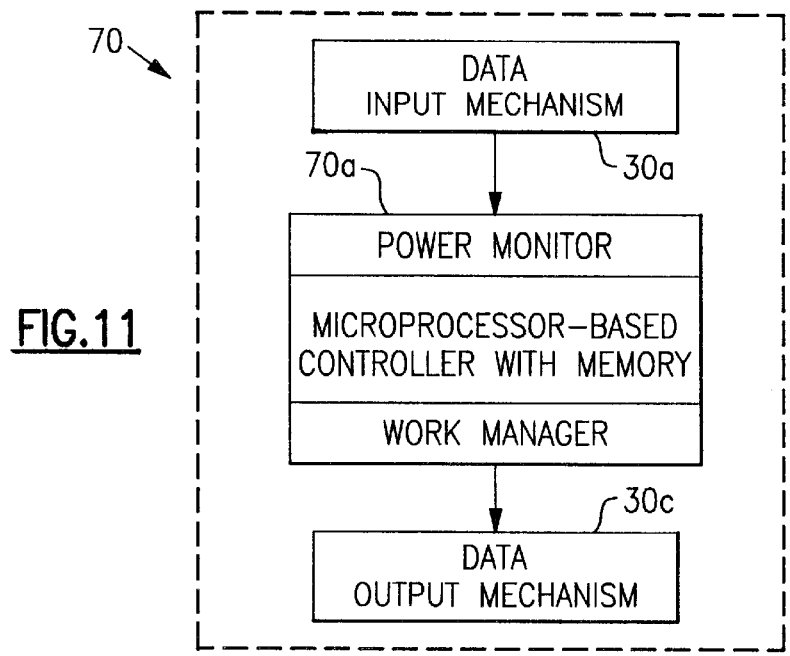
FIG. 11 illustrates a block diagram of a second embodiment of the present invention.
Figure 12:
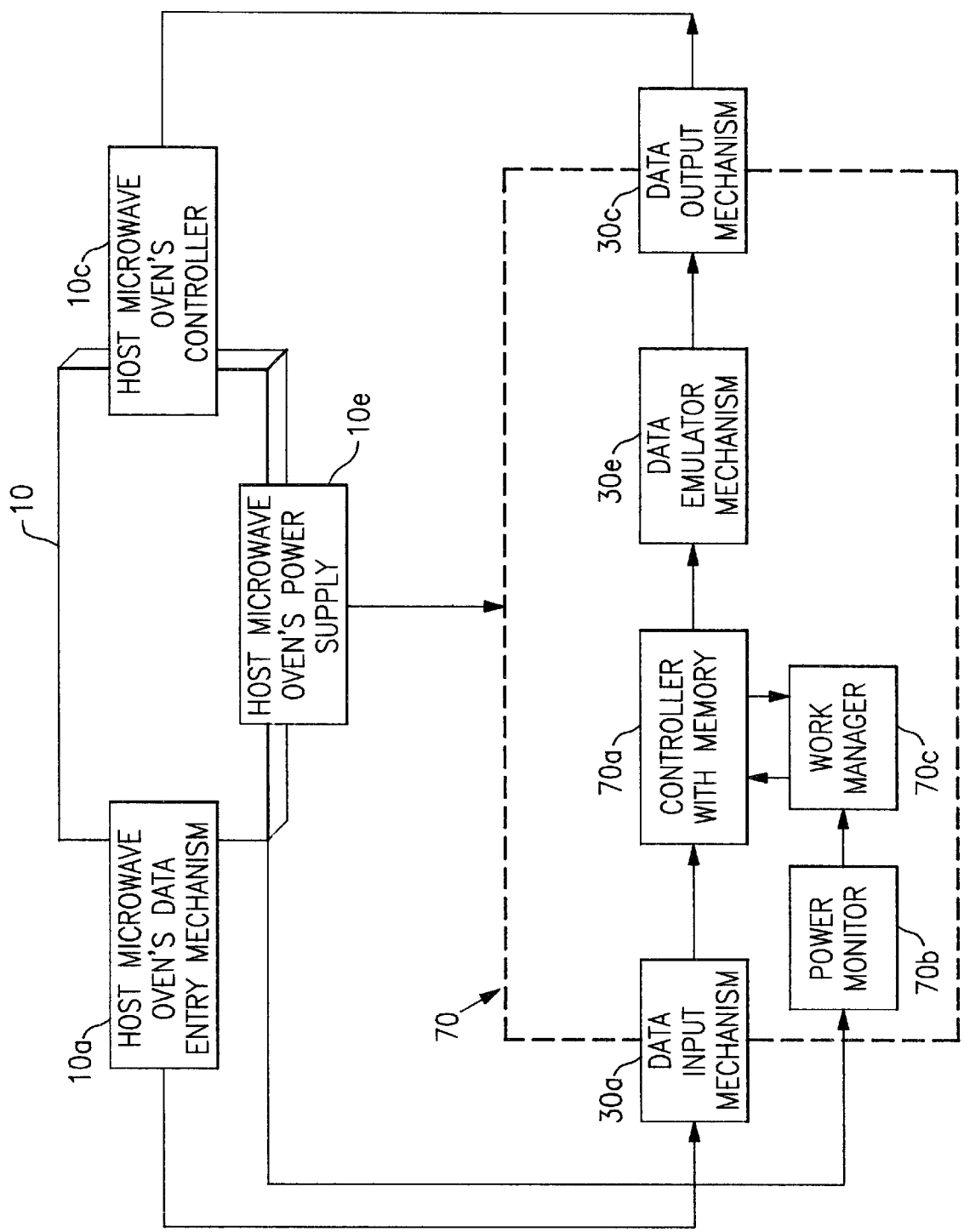
FIG. 12 illustrates a block diagram of FIG. 11.

A top level illustration of the second embodiment of an interpretive BIOS machine 70 is illustrated in FIG. 11. Interpretive BIOS machine 70 comprises a data input mechanism 30a, a microprocessor base controller 70a, and a data output mechanism 30c. As shown in FIG. 5, interpretive BIOS machine 70 receives its operational power from power supply 10e. Data input mechanism 30a and data output mechanism 30c are interactively connected to controller 70 and host microwave oven 10 (discussed above). Controller 70a comprises in part a power monitor 70b, FIG. 12, and Work Manager 70c, FIG. 12. Controller 70a commands and controls all the operational finctions of the second embodiment of the present invention. An example of controller 70a that may, if desired, be used in conjunction with the second embodiment of the present invention is MC68HC11 manufactured by Motorola, Inc. This particular controller has an on-board memory used for storing a software program or data structure that provides controller 70a with instructions as to the operational features of the second embodiment of the present invention.

Work Manager 70c is a software program or a plurality of data structures stored in the memory of controller 70a. The program provides the Work Manager 70c with instructions to interactively control the activity, inactivity or work function of the microwave oven. An example of this control is the Work Manager 70b monitoring, correcting, adjusting, or modifying the work performed on a specimen. Another example is the Work Manager collecting data from at least one sensor and transforming the data into commands for magnetron tube power to controller 70a. The controller 70a has a power monitor 70b connected to the magnetron tube cathode for detecting power consumed by the microwave oven. The power monitor 70b may, if desired, be a sensor connected to the magnetron tube of the microwave oven. The sensor may, if desired, monitor, collect or transmit data to the Work Manager 70c. The data may, if desired, be in a serial or parallel format. The data collected may, if desired be derived from voltage, current, power, power factor, or any phase relationship between any of the aforementioned. An example of a typical power monitor measurement is voltage reading 70b' and current reading 70b", FIG. 13. These two readings, 70b' and 70b", are transmitted to the Work Manager 70c for processing. The means of data transmission from the power monitor 70b to Work Manager 70c may be any ordinary transmission means known to those skilled in the art of data transmission. Power monitor 70b generated data is periodically transmitted to the Work Manager 70c or if desired the Work Manager 70c may request or poll any one or all of the power monitors to begin transmission of monitored data. Power monitor 70b may, if desired, receive data from the magnetron tube at different rates or duty cycles depending on manufacturing selection or design of the magnetron tube and/or the power monitor 70b. A typical example of the Power Monitor 70b in communications with the Work Manager 70c is detecting a no load condition of the magnetron tube. This no load condition indicates the cavity of the microwave oven 10 does not contain an item of sufficient mass to provide a load for the oven.

Data emulator mechanism 30e is operationally connected to and receives encoded instructions from controller 70a. Data emulator 30e transforms those encoded instructions into suitable data for controller 10c. An example of a data emulator is a plurality or bank of operationally connected CD 5053 or CD 4051 devices. The output of data emulator 30e is connected to data output buffer 30c. The output of mechanism 30c is connected to controller 10c. The second embodiment of the interpretive BIOS machine 70 is completely buffered from host microwave oven 10 and is transparent to the user of host microwave oven 10. This buffering allows host microwave oven 10 to operate utilizing the present invention or to operate in the native mode, i.e., receiving data inputs directly from the user.

The Work Manager 70c receives power monitor 70b data structure and BIOS machine 70 data structure via controller 70a. BIOS machine 70 data structure delineates the work requirements to be performed on a specimen disposed within the confines of microwave oven 10. The work requirements were entered into microwave oven 10 by a user in the form of predetermined code 20. The work requirements of the specimen may if desired, be transparent to the user. The user simply extracts the predetermined code 20 from a specimen and enters predetermined code 20 into microwave oven 10. The Work Manager 70c processes the BIOS machine 70's data structure and the power monitor 70b's data structure. The processing of the data structures transforms them into command functions that contain data representing work expended on the specimen or work to be expended on the specimen. Controller 70a generates an instruction set comprising in part the command function provided by Work Manager 70c. Controller 70c then transmits this instruction set to microwave oven 10 to enable the proper work to be performed on the specimen.

Figure 14:
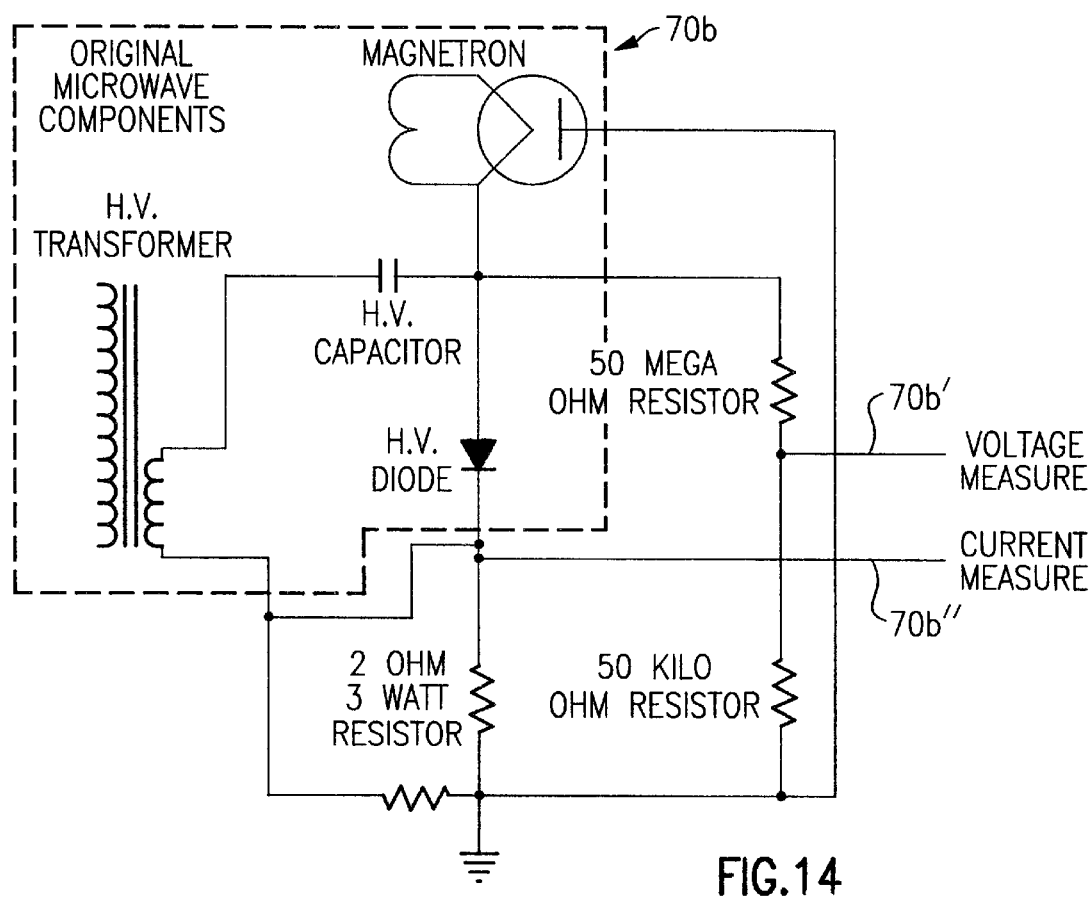
FIG. 14 illustrates a typical electrical circuit for monitoring power of FIG. 13.
Figure 13:
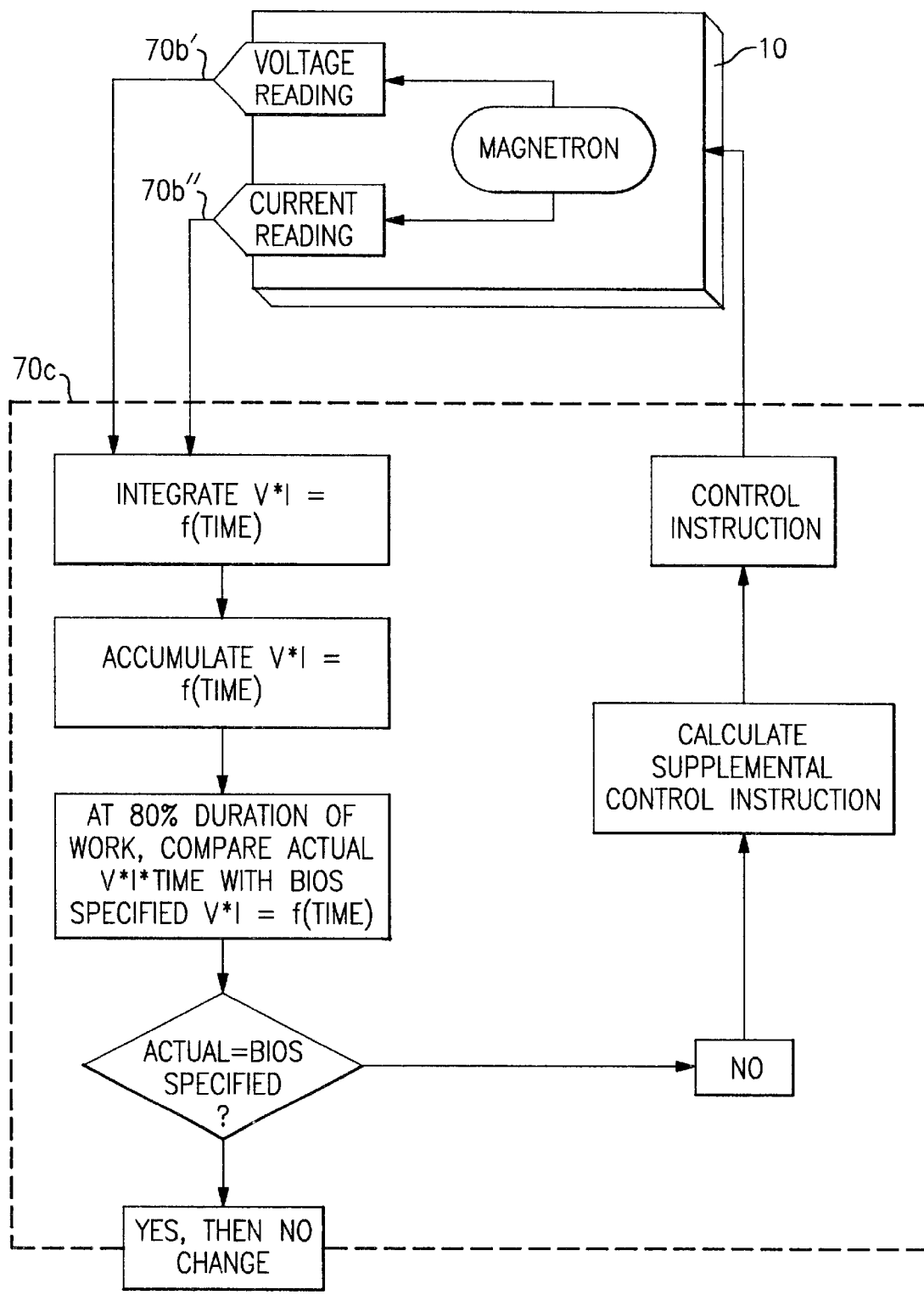
FIG. 13 illustrates the Work Manager of FIG. 12.

A typical example of the operation of the power monitor 70b is illustrated in FIG. 13. A voltage 70b' signal and a current 70b" signal are received from the magnetron tube of host microwave oven 10. The format and transmission of the signals may, if desired, be any convenient method known to those skilled in the art. In this particular example an electronic circuit, FIG. 14, delineating the inner functionality of the power monitor is provided.

Work manager 70c, FIG. 13, receives signals 70b' and 70b" and integrates them with respect to time thereby producing a plurality of selected work functions. These work functions are accumulated at a selected rate to determine the actual work performed by the magnetron tube of microwave oven 10. The Work Manager 70c has received the suggested maximum time and power (work finction) duration for BIOS machine 70. At a predetermined percentage(s) of the suggested work duration the accumulated work function is compared to the actual work performed on the specimen contained within microwave oven 10. If there is a true comparison (yes) no change is made to the work instructions provided to BIOS machine 70. If there is a false (no) result to the comparison a supplemental work function is derived. This supplemental work finction adds or subtracts work from the suggested work function provided by BIOS machine 70. A control function is generated containing the adjusted work function. This control function is transmitted to the magnetron tube of microwave oven 10 wherein microwave oven 10 adjusts the work performed by its magnetron tube. This may, if desired, be a repeated process performed at any selected interval or duration. The duty cycle of microwave oven 10 may be mirrored by this process or timed in conjunction with any duty cycle of any microwave oven known in the art.

Figure 16:
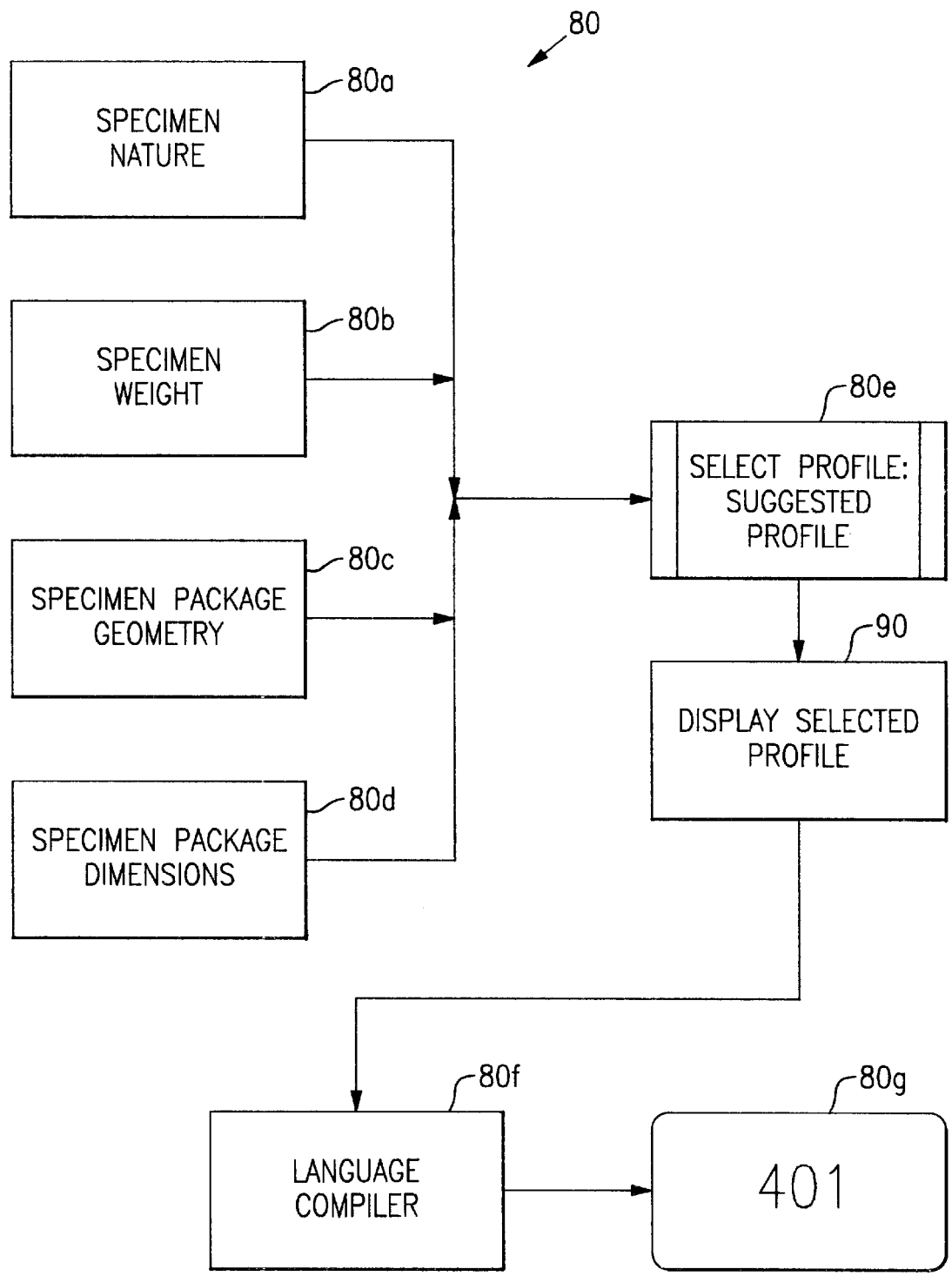
FIG. 16 illustrates a block diagram of a third embodiment of the present invention.

A third embodiment of the present invention is a Code Maker tool generally illustrated as a block diagram at 80, FIG. 16. Code Maker tool 80 provides the manufacturer of the specimen a convenient method to implement a predetermined code that may, if desired, be affixed to the specimen in any convenient manner known in the art. The specimen may, if desired, be represented as a plurality of unique descriptors that delineate unique characteristics of the specimen. Examples of some of descriptors are type 80a, weight 80b, packing geometry 80c, and package dimensions. These are transmitted to and received by the Code Maker 80. Code maker 80 correlates these descriptors into a selected profile 80e that is displayed on a typical computer screen tool 90, FIG. 15. The profile 80e provides all of the selected information and a suggested profile based on a history of all the aforementioned descriptors. Profile 80e is displayed on screen tool 90 for the convenience of the user. A language 80f is provided that has as its syntax all of the descriptors entered by the user and suggested by the Code Maker 80. The language expresses a computed symbol 80g that encapsulates all aforementioned descriptors. The symbol may, if desired, be any length, configuration, geometry, or symbol. A typical example of the symbol 80g comprises the digits 4-0-1.

Figure 17:
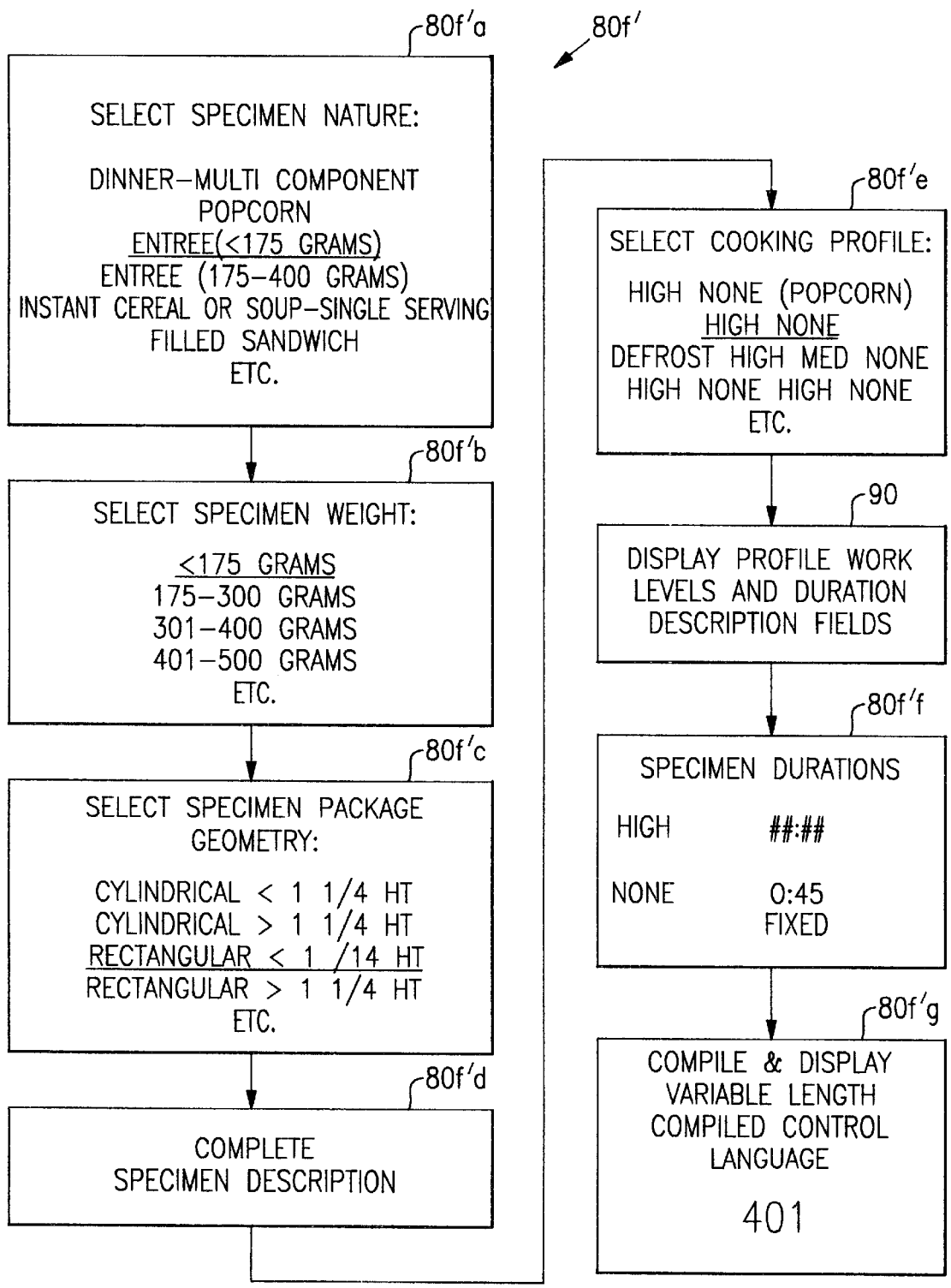
FIG. 17 illustrates an operational block diagram of FIG. 16.
Figure 18:
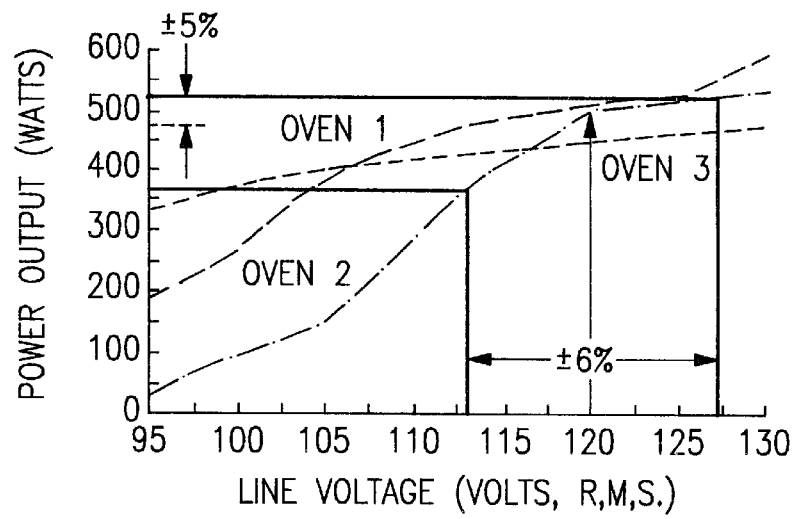
FIG. 18 illustrates line voltage versus power output to a microwave oven.

The code grammar that provides the metes and bounds for language 80f may comprise any format that enables descriptors, provided by a user, to be transformed into a symbol or symbols that are affixed to a specimen. An example of the code grammar that may, if desired, be used in conjunction with screen tool 90 is generally illustrated at 80f', FIG. 17. An entree 80f'a, with a weight of less than 175 grams, 80f'b, is selected. The cooking profile 80f'e is selected to be 'high none'. This profile is first selected and then displayed on screen tool 90. The specimen 80f'f work duration is derived and displayed on screen tool 90 as symbol 401 80f'g.

Figure 19:
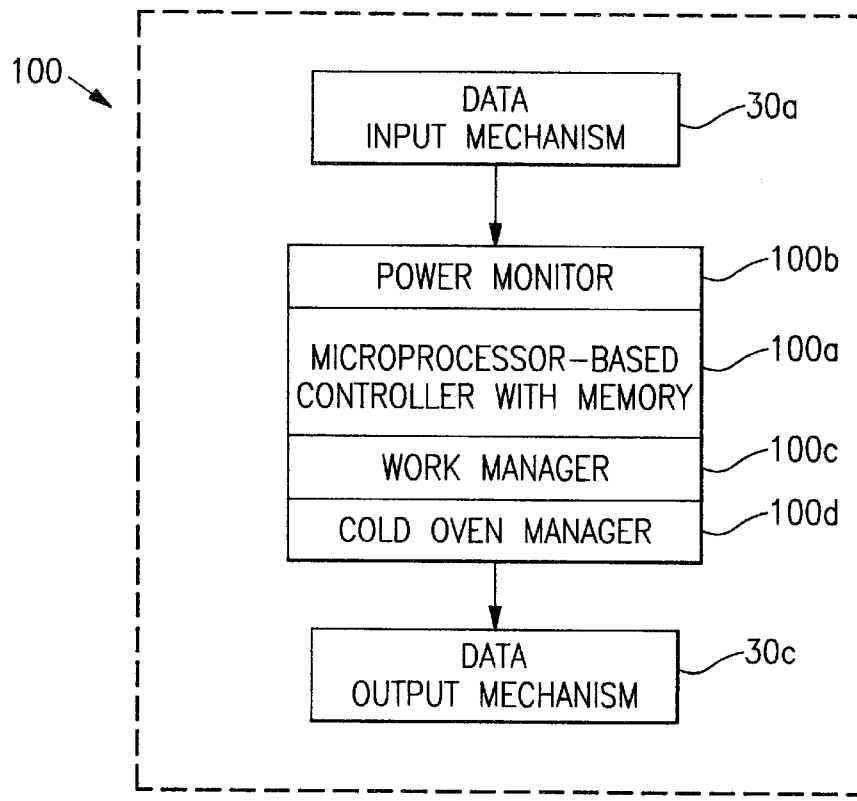
FIG. 19 illustrates a block diagram of the fourth embodiment of the present invention.

A top level illustration of the fourth embodiment of the present invention is illustrated in FIG. 19. Interpretive BIOS machine 100 comprises a data input mechanism 30a, a microprocessor base controller 100a, and a data output mechanism 30c. As shown in FIG. 5, interpretive BIOS machine 100 receives its operational power from power supply 10e. Data input mechanism 30a and data output mechanism 30c are interactively connected to controller 100a and host microwave oven 10 (discussed above). Controller 100a comprises in part a power monitor 100b, FIG. 19, Work Manager 100c, FIG. 19, and Cold Oven Manager 100d. Controller 100a commands and controls all the operational functions of the fourth embodiment of the present invention. An example of controller 100a that may, if desired, be used in conjunction with the fourth embodiment of the present invention is MC68HC11 manufactured by Motorola, Inc. This particular controller has an on-board memory used for storing a software program or data structure that provides controller 100a with instructions as to the operational features of the fourth embodiment of present invention.

Cold Oven Manager 100d is a software program or a plurality of data structures stored in the memory of controller 100a. The program provides the Cold Oven Manager 100d with instructions to interactively control the thermal aberrations of the microwave oven. An example of this control is the Cold Oven Manager 100d in concert with the Work Manager 100c monitoring, correcting, adjusting, or modifying the work performed on a specimen. Another example is the Cold Oven Manager 100d, independent of the Work Manager 100c, collecting data representing thermal activity or inactivity of the microwave oven 10. The Cold oven Manager 100d transforms the data into commands for magnetron tube power and transmits them to controller 100a. The data may, if desired, be in a serial or parallel format. The data collected may, if desired be derived from known power dissipation of a selected microwave oven or from empirical power dissipation from a plurality of microwave ovens. The data collected may also be derived from a time calculation representative of a time period of activity or inactivity of microwave oven usage. The data collected may firther be derived from voltage, current, power, power factor, timing factor or any phase relationship between any of the aforementioned representative of thermal activity or inactivity of a microwave oven. An example of a typical thermal response provided to the Cold Oven Manager 100d is the BIOS machine 100 collecting and storing microwave oven usage in memory. At the appropriate time the BIOS machine 100 would provide the Cold Oven Manager 100d with a selected time period of activity of the microwave oven. The Cold Oven Manager may, if desired, request a particular time period of inactivity or activity of the microwave oven. The Cold Oven Manager 100d calculates and formulates an appropriate time factor representative of an increase or decrease in work performance on the specimen disposed within the confines of the microwave oven. The Cold Oven Manager 100d may, if desired, communicate these instructions to the Work Manager 100c for processing. The Work Manager 100c may, if desired, formulate an instruction set based on the data provided by the Cold Oven Manager 100d along with other data (discussed above) and provide the magnetron tube the proper work requirement to fully reflect the nature of the specimen, thermal activity of the oven, and any age degradation of the oven or magnetron tube.

Figure 20:
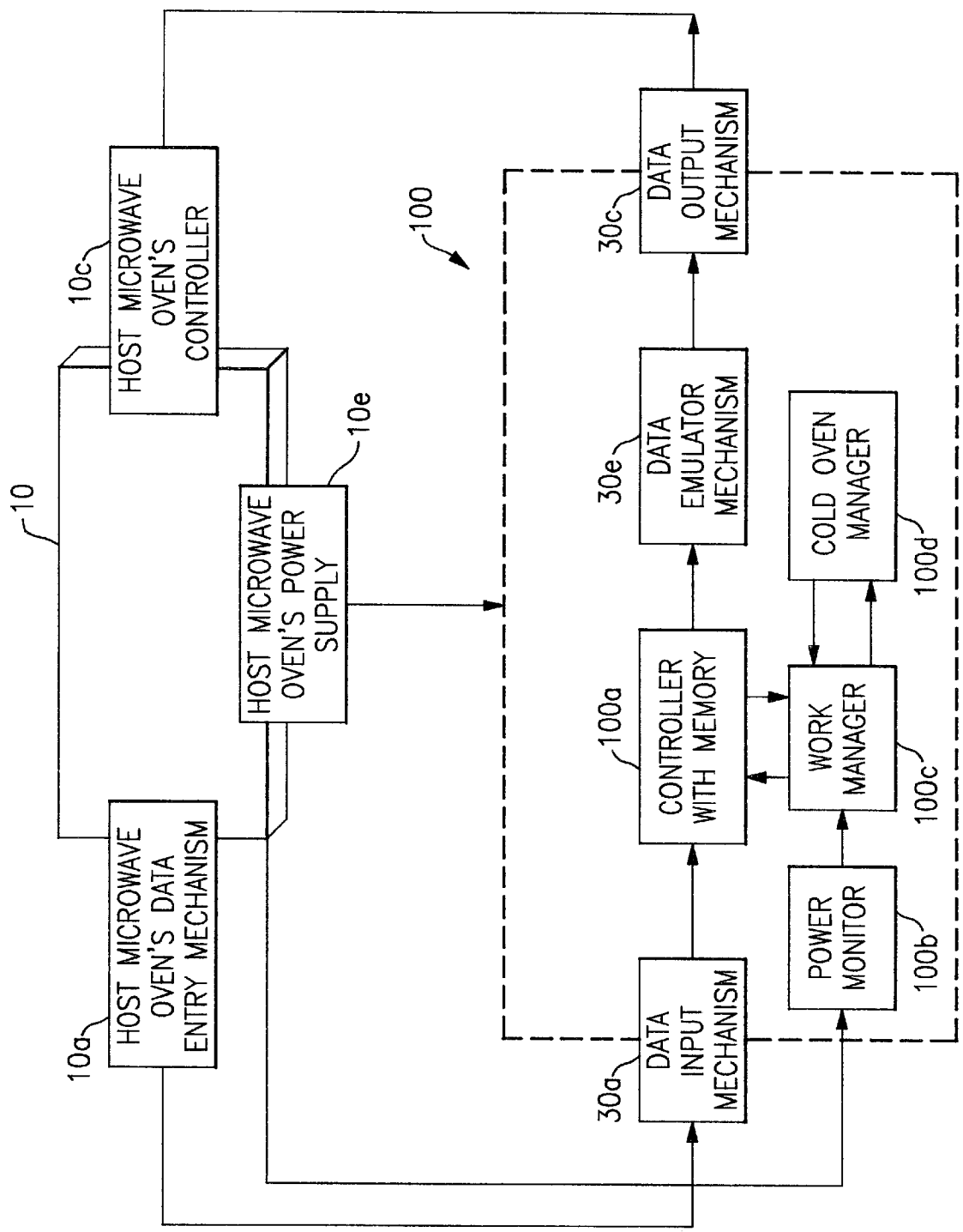
FIG. 20 illustrates a block diagram of FIG. 19.

Data emulator mechanism 30e, FIG. 20, is operationally connected to and receives encoded instructions from controller 100a Data emulator 30e transforms those encoded instructions into suitable data for controller 10c. The output of data emulator 30e is connected to data output buffer 30c. The output of mechanism 30c is connected to controller 10c. The fourth embodiment of the interpretive BIOS machine 100 is completely buffered from host microwave oven 10 and is transparent to the user of host microwave oven 10. This buffering allows host microwave oven 10 to operate utilizing the present invention or to operate in the native mode, i.e., receiving data inputs directly from the user.

Figure 21:
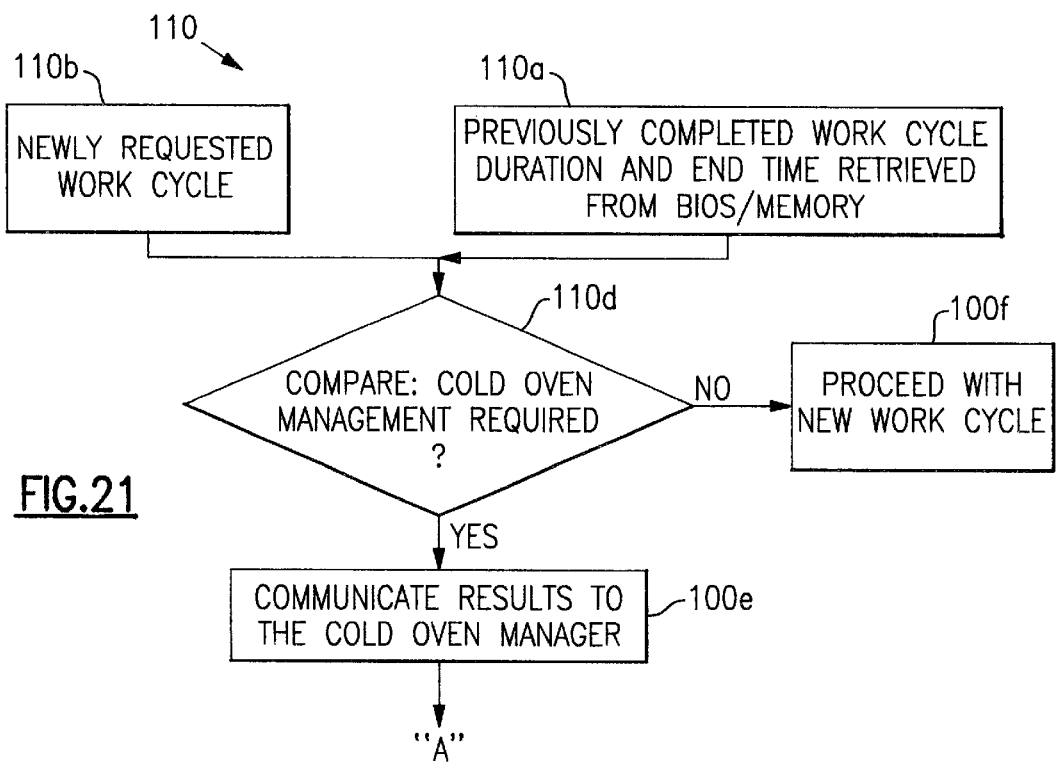
FIG. 21 illustrates a Cold Oven Manager of FIG. 20.

The Work Manager 100c, FIG. 20, receives power monitor 100b data structure and BIOS machine 100 data structure via controller 100a. BIOS machine 100 data structure delineates the work requirements to be performed on a specimen disposed within the confines of microwave oven 10. The work requirements were entered into microwave oven 10 by a user in the form of predetermined code 20. The work requirements of the specimen may if desired, be transparent to the user. The user simply extracts the predetermined code 20 from a specimen and enters predetermined code 20 into microwave oven 10. The Work Manager 100c (refer to the flow diagram 110 of FIG. 21) extracts from memory a previously recorded 110a last work duration or work performed and newly requested work cycle duration cycle interval time 110b. The Work Manager 100c compares 110d the new work requirements 110b to the last work cycle 110a to determine if the new work requirements 110b are within, outside of, or partially overlap a predetermined time window of previous thermal activity of the microwave oven 10. The window is derived from any previously recorded time duration, or required work instructions. If the new work requirements 110b are within the window no alteration or modifications to the work requirements 110c are needed and then work to be performed on the specimen commences 110f. If the new work requirements 110c are outside or partially overlap the window, the Work Manager 100c communicates this result 110e to the Cold Oven Manager 100d.

Figure 22:
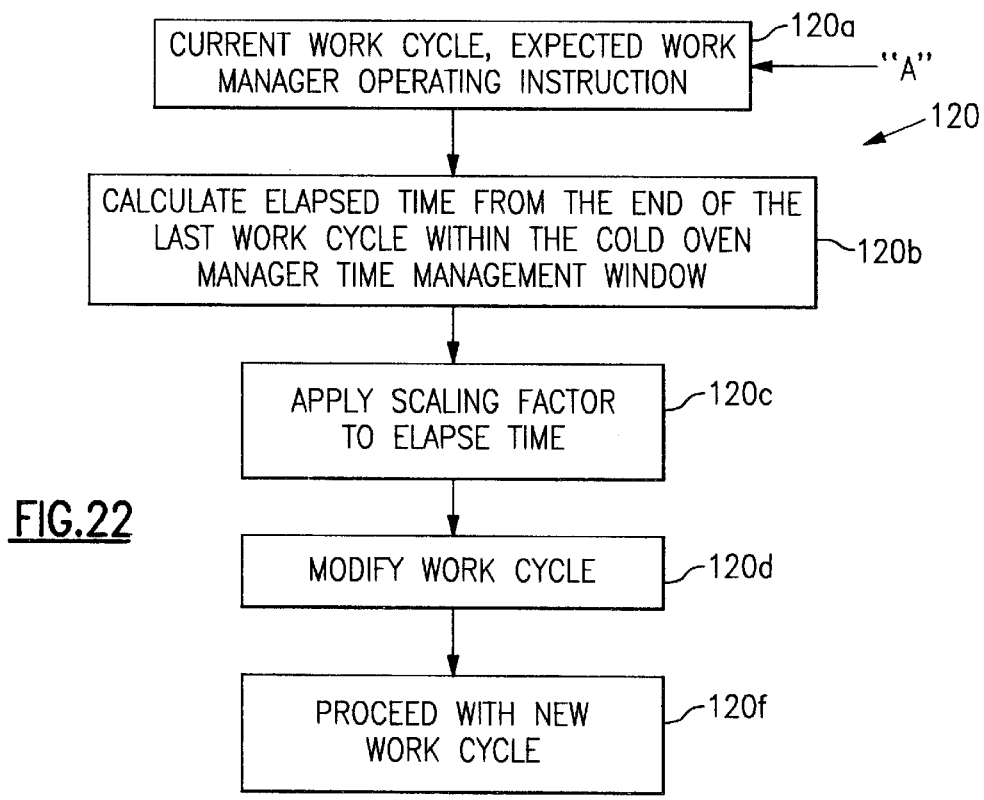
FIG. 22 illustrates a typical flow diagram processing thermal aberrations of a microwave oven.
Figure 23:
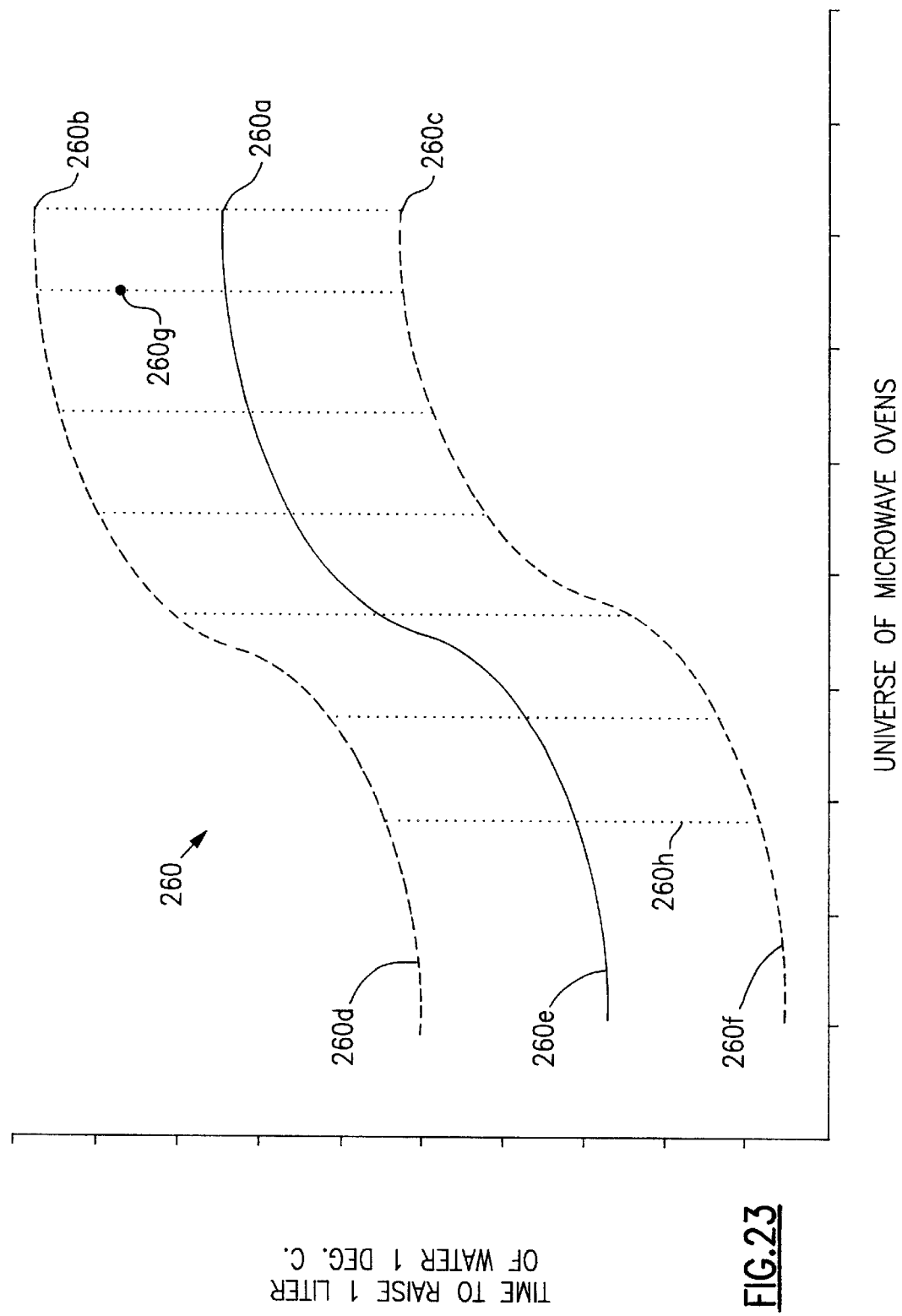
FIG. 23 illustrates a cold oven scalar graph.

The Cold Oven Manager, FIG. 22, receives a data structure package 120a from the BIOS machine 100 or, if desired, from the Work Manager 100c. The data structure package comprises at least one data structure and may, if desired, comprise a plurality of data structures defining the work requirements of the specimen disposed within the confines the microwave oven 10. An Example of these data structures may, if desired, be data defining Work Manager operating instructions, sample mass, composition, and recent aggregate oven operation durations and start and stop times. The Cold Oven Manager 100d calculates the elapsed time from the end of the last work cycle within the Cold Oven Manager tine window 120b. The Cold Oven Manager determines or calculates a modification to the expected work cycle received from the Work Manager. An example of this modification would be an increase or decrease in the work performed on the specimen. Any one of the variables of work may, if desired, be changed to reflect the thermal aberrations of the microwave oven. The Cold Oven Manager 100d may, if desired, apply a scaling factor 120c to the elapsed time 120b. This scaling factor 120c corrects for the thermal aberrations of the microwave oven 10 by modifying the work cycle 120d. The Cold Oven Manager 100d then proceeds with the new work cycle 120f. The scaling factor may be derived from empirical means such as test results. The tests are the results of heating various like composition and like mass food samples in the oven in both cold and warm oven states. These results, for example, may for one sample composition type and mass, if desired, be plotted on a graph 200, FIG. 23. A plurality of scalar values may now be determined from graph 200. Those scalar values are derived from the distance a select scalar point is to the median 260a, measured along the vertical axis of graph 200. Any number of points may, if desired, be disposed along any given vertical line extending from median line 260a. An example of this scalar value is scalar point 260g representing a value of 0.25 and scalar point 260h. The selected scalar values when applied to the modified work cycle 120d's transforms the power and time duration contained therein into operating characteristics for microwave oven 10.

The Cold Oven Manager 100d processing of the data structures transforms them into an instruction set or, if desired, command functions that contain data representing work expended on the specimen or work to be expended on the specimen. A typical example of the instruction set would be the controller 100a generating an instruction set comprising in part the command function provided by Work Manager 100c. Controller 100a then transmits this instruction set to microwave oven 10 to enable the proper work to be performed on the specimen. A typical example of command functions may, if desired, be functions that contain all the data necessary to provide the BIOS machine with modified work commands to be applied to the specimen. In this example the Cold Oven Manager 100d communicates directly with the BIOS machine 100 in absence of the Work Manager 100c.

A preferred mode of operation of the present invention is to provide controller 30b with a memory containing an embedded interpretive BIOS machine 30. Controller 30b is operatively disposed within microwave oven 10. Microwave oven 10 provides a data entry mechanism 10a that is operatively connected to oven 10 and controller 30b. The data entry mechanism 10a receives data from the user of microwave oven 10 and then transmits that data to the interpretive BIOS machine 30. Interpretive BIOS machine 30 selects a mode of operation from the received data. Interpretive BIOS machine 30 then validates the selected mode of operation, interprets the received data into time duration and power level data, converts the time duration and power level data to selected BIOS power level(s) and power level time duration(s). The resulting process control instruction set, through a series of scalars, is then scaled to the host oven or host process. Interpretive BIOS machine 30 then transmits the interpreted and scaled data to the microwave oven 10 whereupon the microwave oven operates as per BIOS interpreted and scaled time duration(s) and power level(s).

A preferred mode of operation of the second embodiment of the present invention is to provide controller 70a with a memory containing an embedded interpretive BIOS machine 70. Controller 70a is operatively disposed within microwave oven 10. Microwave oven 10 provides a data entry mechanism 10a that is operatively connected to oven 10 and controller 70a. The data entry mechanism 10a receives the work requirements from the user of microwave oven 10 and then transmits these requirements to the interpretive BIOS machine 70. The Work Manager 70c disposed within and in communication with BIOS machine 70 receives signals from power monitor 70b. The Work Manager 70c interprets the work requirements received from BIOS machine 70 and the signals received from Power Monitor 70b. The Work Manager 70c processes the BIOS machine 70's work requirements and the power monitor 70b's signals. The processing transforms the interpreted signals and requirements into command functions that contain data representing work expended on the specimen or work to be expended on the specimen. Controller 70a generates an instruction set comprising in part the command function provided by Work Manager 70c. Controller 70c then transmits this instruction set to microwave oven 10 to enable the proper work to be performed on the specimen.

A preferred mode of operation of the third embodiment of the present invention is to provide a Code Maker tool 80 that enables the manufacturer of the specimen a convenient method to implement a predetermined code that may, if desired, be affixed to the specimen in any convenient manner known in the art. The specimen may, if desired, be represented as a plurality of unique descriptors that delineate the unique characteristics of the specimen. Code maker 80 correlates these descriptors into a selected profile 80e that represents the work requirements of the specimen. The descriptors are formulated into a convenient arrangement of numbers or other symbols governed by the code grammar rules. The number or symbol (predetermined code) is then affixed to the specinen.

The data entry mechanism 10a receives predetermined code from the user of microwave oven 10 and then transmits the predetermined code to the interpretive BIOS machine 70. The Work Manager 70c in communication with the BIOS machine 70 receives signals from power monitor 70b. The Work Manager 70c interprets the work requirements received from BIOS machine 70 and the signals received from Power Monitor 70b. The Work Manager 70c processes the BIOS machine 70's work requirements and the power monitor 70b's signals. The processing transforms the interpreted signals and requirements into command finctions that contain data representing work expended on the specimen or work to be expended on the specimen. Controller 70a generates an instruction set comprising in part the command function provided by Work Manager 70c. Controller 70c then transmits this instruction set to microwave oven 10 to enable the proper work to be performed on the specimen.

A preferred mode of operation of the fourth embodiment of the present invention is to provide a Cold Oven Manager that enables a BIOS machine the control of the thermal aberrations of a microwave oven. An interpretive BIOS machine is interactively connected and communicating with a Cold Oven Manager. The Cold Oven Manager machine receives the current work expected from the BIOS machine. The Cold Oven Manager determines the elapse time from the end of the last work cycle and establishes a cold oven time window. The Cold Oven Manager compares the elapse time to the time window and calculates a time differential between the elapse time and the time window. The Cold Oven Manager modifies the work instructions with the computed time differential and then communicates those instructions to the BIOS machine for implementation thereby controlling the thermal aberrations of a microwave oven.

The present invention may, if desired, be programmed in any suitable programming language known to those skilled in the art. An example of a programming language is disclosed in C Programming Language, 2/e, Kernighan & Richtie, Prentice Hall, (1989).

While the present invention has been described specifically with respect to microwaves being the energy source employed, it is to be understood that other energy sources along the electromagnetic radiation spectrum can be employed by modifying or using different ovens or housings. For example, ultraviolet, laser light, infrared, alpha, beta, gamma, or x-ray radiation, or combinations thereof, can be employed. It would be a matter of developing specific profiles for the items to be "processed" by the radiation. Such items are not limited to food, but may also include, but are not limited to, painted articles where the paint is to be cured by infrared or UV light, coatings which may be cured by UV light, polymerization by UV light, irradiation of objects by radioactive energy beams, cutting, warming or melting of objects by infrared or laser light, and the like. In essence, wherever energy is to be directed at an article, a multi-step or multiphase sequence of operations is to occur (or a single step or phase) and a profile of radiation application can be developed, the present invention can be used to permit such profile to be entered into a BIOS or machine which will accept and convert the data into operational signals which control, via a microprocessor or similar controller, the actuation, direction and characteristics of the energy source with respect to the article to be processed. In place of the excitation of water molecules, the respective energy processing properties can be determined with reasonable predictability to develop standard codes for processing standard items. Such items can then be predictably and repeatably processed to reduce random variation in result and improve quality control and quality assurance.

Therefore, while the present invention has been described with respect to food and microwaves, the description is intended to encompass the above mentioned variations and alternatives. Although the specific mechanisms for each radioactive source and article to be processed are not described, it would be obvious to those skilled in the respective art to be able to standardize profiles with minimal experimentation and to modify the hardware described herein to accommodate a different energy source, with concomitant protective and safety features considered.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims, means-plus-function clause is intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A Cold Oven Manager for a microwave oven, receiving at least one internal thermal aberration parameter stimulus, comprising:

a) a computer with a memory;

b) a program stored within said memory, said program having at least one thermal aberration data structure responsive to the received parameter stimulus;

c) an instruction set derived from said at least one internal thermal aberration parameter stimulus; and, d) a work requirement derived from said instruction set;

whereby the Cold Oven Manager adjusts said work requirement to reflect the thermal conditions of the microwave oven.

2. A Cold Oven Manager as recited in claim 1 wherein, said work requirement providing the Cold Oven Manager with at least one work instruction for the microwave oven.

3. A Cold Oven Manager for a microwave oven, the microwave oven having an interpretive BIOS machine for a computer or microprocessor controlled host microwave oven or chemical, physical, or thermodynamic process stream, the oven or process stream having a data entry mechanism operatively disposed thereon, and cavity disposed therein, the cavity sized to receive a specimen, the microwave oven receiving commands to perform work on the specimen, comprising:

a) a system controller having a memory, said controller operatively disposed intermediate said data entry mechanism and said host microwave oven or process stream;

b) means for deriving a code for entry into said data mechanism;

c) means, stored in said memory, for receiving and interpreting said code;

d) a scaling data structure having data determined by said interpreted code, said data being scaled to the sample mass, sample geometry, and sample composition specific work producing operating characteristics, in-situ elevation, and age degraded performance characteristics of said host microwave oven or process stream;

e) means, stored in said memory, for receiving data from the BIOS machine, said data defining the thermal activity of the microwave oven, said means processing said data; and, f) an instruction set generated from said processed data, said instruction set commanding the BIOS machine to alter the work commands; whereby work performed on the specimen reflects the thermal conditions of the microwave oven.

4. A Cold Oven Manager for a microwave oven, the microwave oven having a BIOS machine operatively disposed therein, the microwave oven having a cavity disposed therein, the cavity sized to receive a specimen, the microwave oven receiving commands to perform work on the specimen, comprising:

a) a program operatively disposed within the BIOS machine;

b) said program receiving data from the BIOS machine said data comprises the last work performed and duration cycle finish time;

c) an instruction set generated from said data, said instruction set commanding the BIOS machine to alter the work commands; and, d) a Work Manager interactively disposed to the BIOS machine, said Work Manager interactively connected to and communicating with the Cold Oven Manager, said Work Manager receiving said instruction set from the Cold Oven Manager, whereby said Work Manager alters work to be performed on the specimen; and whereby said altered work is scaled to increase the work performed on the specimen.

5. The Cold Oven Manager as recited in claim 4, wherein said altered work is scaled to decrease the work performed on the specimen.

6. The Cold Oven Manager as recited in claim 5, wherein said BIOS machine defines the thermal activity of the microwave oven.

7. The Cold Oven Manager as recited in claim 6, wherein said Work Manager defines the thermal activity of the microwave oven.

8. The Cold Oven Manager as recited in claim 7, wherein said program processes said data.

9. The Cold Oven Manager as recited in claim 8, wherein said program flags data indicating insufficient mass disposed within said cavity to receive power.

* * * * *